US012164257B2

(12) United States Patent
Okada et al.

(10) Patent No.: US 12,164,257 B2
(45) Date of Patent: Dec. 10, 2024

(54) CLEANING ROD FOR OPTICAL PRINT HEAD INCLUDED IN IMAGE FORMING APPARATUS

(71) Applicant: CANON KABUSHIKI KAISHA, Tokyo (JP)

(72) Inventors: Yuta Okada, Ibaraki (JP); Shinichiro Hosoi, Tokyo (JP); Takehiro Ishidate, Tokyo (JP); Toshiki Momoka, Tokyo (JP); Ryota Fukumoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/726,366

(22) Filed: Apr. 21, 2022

(65) Prior Publication Data

US 2022/0244675 A1 Aug. 4, 2022

Related U.S. Application Data

(62) Division of application No. 17/119,072, filed on Dec. 11, 2020, now Pat. No. 11,340,550.

(30) Foreign Application Priority Data

Dec. 12, 2019 (JP) ................................ 2019-224693

(51) Int. Cl.
*G03G 21/00* (2006.01)
*G03G 15/01* (2006.01)
(Continued)

(52) U.S. Cl.
CPC ....... *G03G 21/0005* (2013.01); *G03G 15/011* (2013.01); *G03G 15/04036* (2013.01);
(Continued)

(58) Field of Classification Search
CPC ......... G03G 21/0005; G03G 15/04036; G03G 15/04054; G03G 2221/0089;
(Continued)

(56) References Cited

U.S. PATENT DOCUMENTS

| | | | |
|---|---|---|---|
| 9,019,332 B2 | 4/2015 | Otoguro et al. | 347/245 |
| 9,195,162 B2 | 11/2015 | Otoguro et al. | G03G 15/043 |

(Continued)

FOREIGN PATENT DOCUMENTS

| | | |
|---|---|---|
| JP | H02-150882 | 6/1990 |
| JP | 2006-218656 | 8/2006 |

(Continued)

OTHER PUBLICATIONS

Office Action dated Aug. 29, 2023 in counterpart Japanese Application No. 2019-224693, together with English translation thereof.

(Continued)

*Primary Examiner* — Arlene Heredia
*Assistant Examiner* — Laura Roth
(74) *Attorney, Agent, or Firm* — Venable LLP

(57) ABSTRACT

A cleaning rod includes a rod-like member, a slidable portion which is provided on a free end side of the rod-like member with respect to a direction in which the cleaning rod is inserted and which is slidable on a light emergent surface of a lens of an image forming apparatus, and a restricting portion configured to restrict movement of the slidable portion in a direction away from the light emergent surface with respect to an optical axis direction by contacting the holder at each of free ends of opposing wall portions of a holder of the image forming apparatus from a side opposite from a side where a photosensitive member of the image forming apparatus is provided with respect to the optical axis direction in a state in which the slidable portion contacts the light emergent surface.

5 Claims, 13 Drawing Sheets

(51) Int. Cl.
*G03G 15/04* (2006.01)
*G03G 21/16* (2006.01)

(52) U.S. Cl.
CPC ... *G03G 21/1666* (2013.01); *G03G 15/04054* (2013.01); *G03G 2215/0409* (2013.01); *G03G 2221/0089* (2013.01)

(58) Field of Classification Search
CPC ... G03G 2215/0409; G03G 2215/0407; G03G 2215/0412; G03G 21/1666; G03G 21/1633; G03G 21/169; G03G 2221/1636; G03G 15/04063; G03G 15/011; B08B 1/005; B08B 1/008
See application file for complete search history.

(56) References Cited

U.S. PATENT DOCUMENTS

| | | | | |
|---|---|---|---|---|
| 2005/0012973 | A1 | 1/2005 | Sowa et al. | 359/212.1 |
| 2006/0001980 | A1 | 1/2006 | Namba | 359/649 |
| 2009/0250080 | A1 | 10/2009 | Wong et al. | 134/6 |
| 2018/0095405 | A1 | 4/2018 | Iwai et al. | G03G 2215/0409 |
| 2018/0364608 | A1 | 12/2018 | Momoka et al. | G03G 21/00 |
| 2018/0364614 | A1 | 12/2018 | Aruga et al. | G03G 21/1671 |
| 2018/0364636 | A1 | 12/2018 | Imai et al. | G03G 2215/0409 |
| 2019/0129353 | A1 | 5/2019 | Hosoi et al. | G03G 15/04036 |
| 2019/0179252 | A1 | 6/2019 | Iwai et al. | G03G 21/007 |
| 2020/0117112 | A1 | 4/2020 | Ishidate et al. | G03G 15/0435 |
| 2020/0117114 | A1 | 4/2020 | Otsubo et al. | G03G 15/04 |
| 2020/0117115 | A1 | 4/2020 | Ishidate et al. | G03G 21/1666 |
| 2020/0174396 | A1 | 6/2020 | Okada et al. | G03G 15/04072 |
| 2020/0174417 | A1 | 6/2020 | Imai et al. | G03G 15/011 |
| 2020/0292984 | A1 | 9/2020 | Iwai et al. | G03G 15/04063 |
| 2020/0292985 | A1 | 9/2020 | Aruga et al. | G03G 21/0047 |

FOREIGN PATENT DOCUMENTS

| | | |
|---|---|---|
| JP | 2007-072321 | 3/2007 |
| JP | 2008-099200 | 4/2008 |
| JP | 2008-173811 | 7/2008 |
| JP | 2009-122427 | 6/2009 |
| JP | 2019-003113 | 1/2019 |
| JP | 2019-082503 | 5/2019 |

OTHER PUBLICATIONS

Office Action dated Feb. 6, 2024 in counterpart Japanese Application No. 2019-224693, together with English translation thereof.

(a)

(b)

(a)

(b)

(c)

(d)

CLEANING ROD FOR OPTICAL PRINT HEAD INCLUDED IN IMAGE FORMING APPARATUS

This application is a division of application Ser. No. 17/119,072 filed Dec. 11, 2020, currently pending, and claims priority under 35 U.S.C. § 119 from Japan application No. 2019-224693 filed in Japan on Dec. 12, 2019; the content of all of which are incorporated herein by reference as if set forth in full.

FIELD OF THE INVENTION AND RELATED ART

The present invention relates to a cleaning rod for cleaning on exposure device suitable for use with an image forming apparatus, of an electrophotographic type, such as a printer, a copying machine, a facsimile machine or a multi-function machine.

As the image forming apparatus of the electrophotographic type, in order to expose a photosensitive drum to light, for example, there is an image forming apparatus employing an exposure device including a plurality of light emitting elements such as LEDs (light emitting diodes), original EL (electro-luminescence) devices or the like. In this exposure device, the plurality of LEDs are arranged along a rotational axis direction of the photosensitive drum (along a main scan direction of the exposure device). Further, in order to concentrate light emitted from each of the LEDs onto a surface of the photosensitive drum, the exposure device includes a lens array in which a plurality of lens of a refractive index distribution type are arranged in the main scan direction so as to oppose the respective LEDs. This lens array is very short in focal length, and therefore, the exposure device is disposed so that the lens array is positioned at a position close to the photosensitive drum when the photosensitive drum is exposed to light.

As described above, the lens array is disposed at the position close to the photosensitive drum, and therefore, a foreign matter such as toner or paper powder is liable to deposit on a light emergent surface of the lens array. When the foreign matter deposits on the light emergent surface, a light quantity of the light irradiated from the LED is liable to become non-uniform when the photosensitive drum is exposed to light, with the result that image defect such as density non-uniformity occurred on a recording material on which an image is formed. Therefore, in order to clean the lens array (specifically the light emergent surface), a cleaning means mountable to and dismountable from the exposure device has been proposed (Japanese Laid-Open Patent Application (JP-A) 2019-3113). In this case, an operator such as a user or a service person inserts a cleaning member (cleaning rod) into the image forming apparatus and causes the inserted cleaning member to reciprocate manually in the main scan direction. Then, a cleaning blade provided at a free end of the cleaning member is moved while sliding on the lens array, so that the foreign mater on the light emergent surface of the lens array can be removed by a slidable member.

In the image forming apparatus disclosed in JP-A 2019-3113, a holding member (casing) of the exposure device for holding the lens array and the LEDs is provided with projected portions formed along the main scan direction, and by the projected portions, guiding grooves for guiding the cleaning member in the main scan direction are formed. In the case of this constitution, when the operator mounts the cleaning member on the exposure device, an engaging portion formed on the cleaning member is engaged with the projected portions (guiding grooves) of the holding member. By this, the operator is capable of causing the cleaning member to reciprocate relative to the exposure device.

Incidentally, the holding member is formed of a resin material. However, when the holding member is made of the resin material, there is a liability that the holding member is deformed by warpage during molding, linear (thermal) expansion with temperature rise during an operation of a main assembly of the image forming apparatus, and the like. As described above, the lens array is very short in focal length, and therefore, if the holding member is deformed even when a degree of deformation is slight, a focus does not conform to the surface of the photosensitive drum, so that it becomes difficult to appropriately expose the photosensitive drum to light. Therefore, it would be considered that the holding member is formed by subjecting a metal plate (electrogalvanized steel plate or the like) which is not readily deformed more than a resin material is, to bending. However, in that case, compared with the case where the holding member is made of the resin material, there arises a problem such that it is difficult to form the guiding grooves by performing the above-described processing of the projected portions and thus it takes time and effort and a cost becomes high. Further, it would also been considered that the holding member is formed by welding a plurality of metal plates including the metal plate provided with the projected portions in advice, but such a constitution also requires time and effort and is high in cost and thus is not appropriates. Therefore, in the case where the holding member is formed of metal, it was difficult for the engaging portion of the conventional cleaning member to engage with the holding member.

SUMMARY OF THE INVENTION

According to an aspect of the present invention, there is a provided a cleaning rod to be inserted into an image forming apparatus from an outside by an operator for cleaning a light emergent surface of a lens, wherein the image forming apparatus includes a substrate including a light emitting element for emitting light to which a photosensitive member is exposed, the lens for concentrating light emitted from the light emitting element onto the photosensitive member, and a holder which is made of metal and which includes an elongated base portion opposing the photosensitive member and holding the lens and which includes a pair of opposing wall portions opposing each other with respect to a perpendicular direction perpendicular to an optical axis direction of the lens and to a longitudinal direction of the base portion, the opposing wall portions extending from the base portion toward a side opposite from a side where the photosensitive member is provided, the cleaning rod comprising: a rod-like member; a slidable portion which is provided on a free end side of the rod-like member with respect to a direction in which the cleaning rod is inserted and which is slidable on the light emergent surface; and a restricting portion configured to restrict movement of the slidable portion in a direction away from the light emergent surface with respect to the optical axis direction by contacting the holder at each of free ends of the opposing wall portions from the side opposite from the side where the photosensitive member is provided with respect to the optical axis direction in a state in which the slidable portion contacts the light emergent surface.

According to another aspect of the present invention, there is provided a cleaning rod to be inserted into an image forming apparatus from an outside by an operator for cleaning a light emergent surface of a lens, wherein the image forming apparatus includes a substrate including a light emitting element for emitting light to which a photosensitive member is exposed, the lens for concentrating light emitted from the light emitting element onto the photosensitive member, and a holder which is made of metal and which includes an elongated base portion opposing the photosensitive member and holding the lens and which includes a pair of opposing wall portions opposing each other with respect to a perpendicular direction perpendicular to an optical axis direction of the lens and to a longitudinal direction of the base portion, the opposing wall portions extending from the base portion toward a side opposite from a side where the photosensitive member is provided, the cleaning rod comprising: a rod-like member; a slidable portion which is provided on a free end side of the rod-like member with respect to a direction in which the cleaning rod is inserted and which is slidable on the light emergent surface; a restricting portion configured to restrict movement of the slidable portion in a direction away from the light emergent surface with respect to the optical axis direction by contacting the holder at a free end of one opposing wall portion of the opposing wall portions from the side opposite from the side where the photosensitive member is provided with respect to the optical axis direction in a state in which the slidable portion contacts the light emergent surface; a first wall portion opposing the one opposing wall portion with respect to the perpendicular direction and positioned on a side opposite from a side where the other opposing wall portion is provided relative to the one opposing wall portion; and a second wall portion opposing the other opposing wall portion with respect to the perpendicular direction and positioned on a side opposite from a side where the one opposing wall portion is provided relative to the other opposing wall portion, wherein an interval between the first wall portion and the one opposing wall portion with respect to the perpendicular direction is smaller than a distance from one end of the slidable portion to one end of the light emergent surface with respect to the perpendicular direction when the slidable portion is seen along the optical axis direction, and an interval between the second wall portion and the other opposing wall portion with respect to the perpendicular direction is smaller than a distance from the other end of the slidable portion to the other end of the light emergent surface with respect to the perpendicular direction when the slidable portion is seen along the optical axis direction.

Further features of the present invention will become apparent from the following description of exemplary embodiments with reference to the attached drawings.

Figure 2:
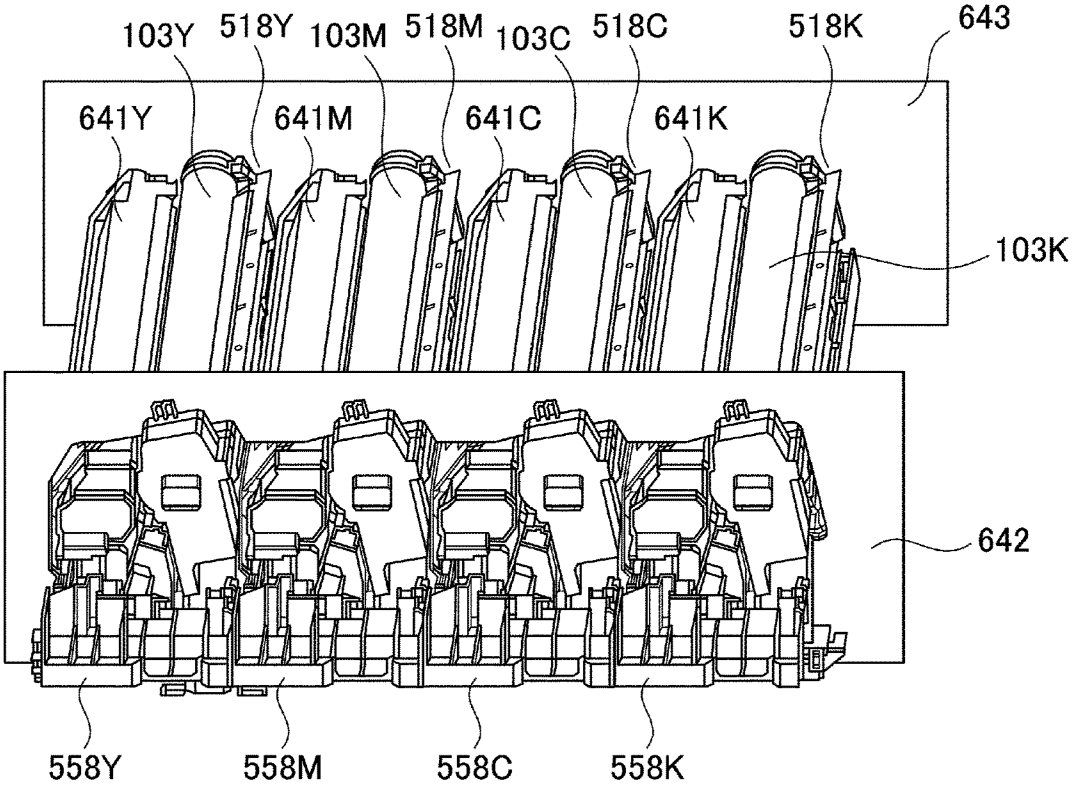
Figure 2:
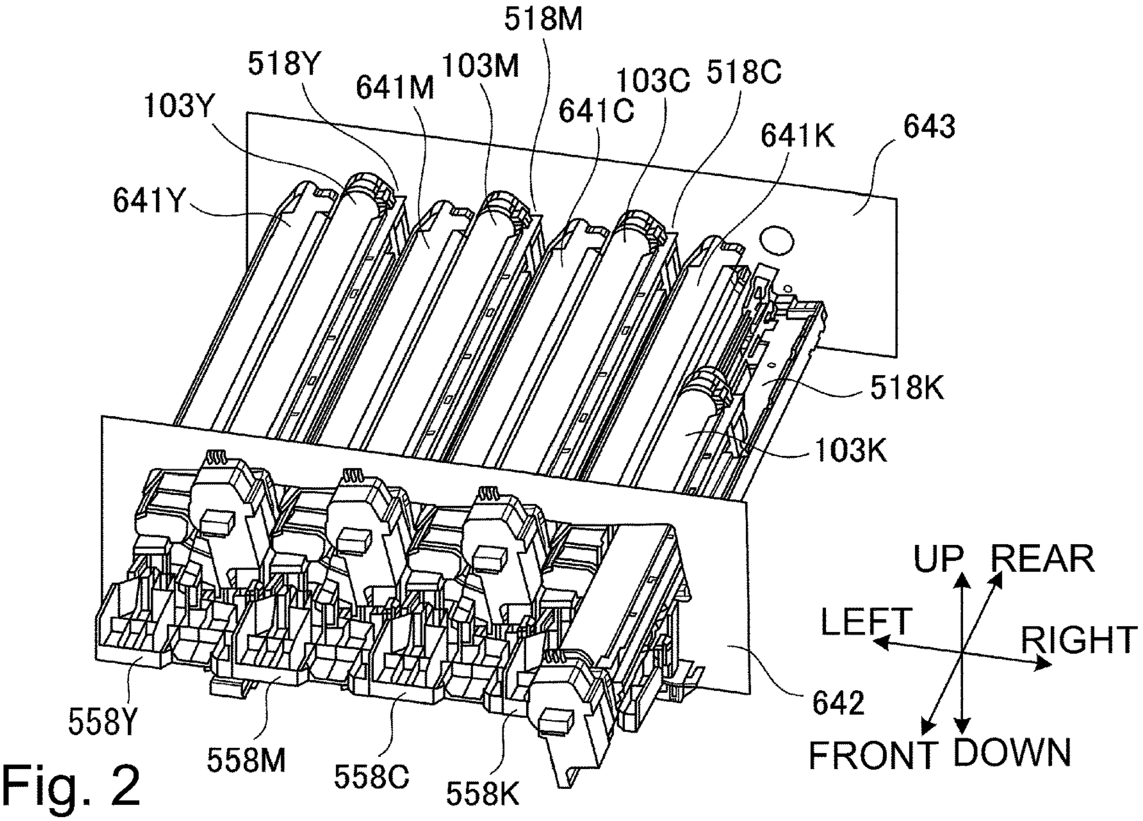

Parts (a) and (b) of FIG. 2 are schematic views for illustrating structures of showing a drum unit and a developing unit, and a periphery thereof, in which part (a) shows a mounted state, and part (b) shows a state of being dismounted.

Figure 3:
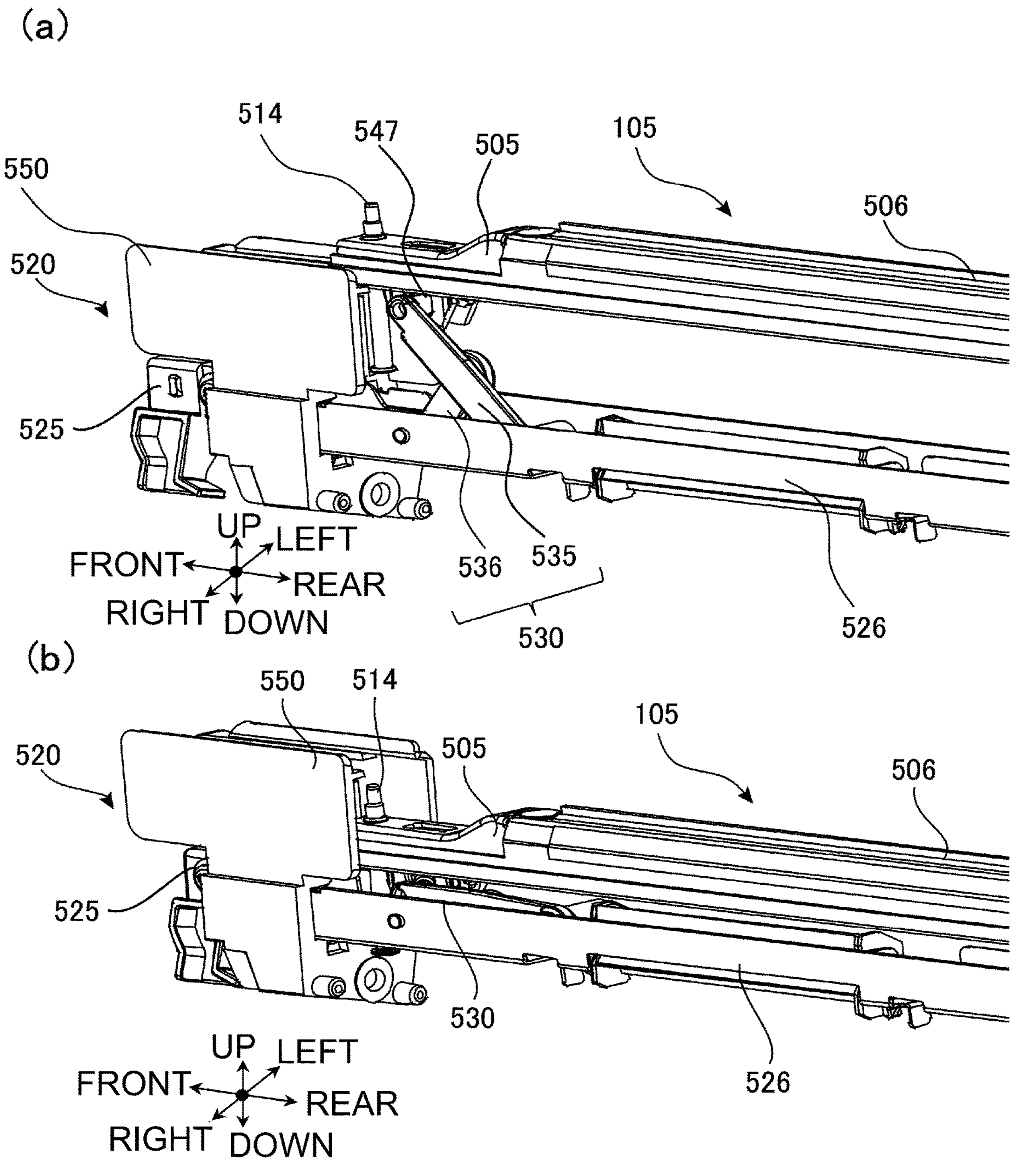

Parts (a) and (b) of FIG. 3 are perspective views showing a portion of an exposure unit, in which part (a) shows the case where an exposure device is in an exposure position, and part (b) of FIG. 3 shows the case where the exposure device is in a retracted position.

Figure 4:
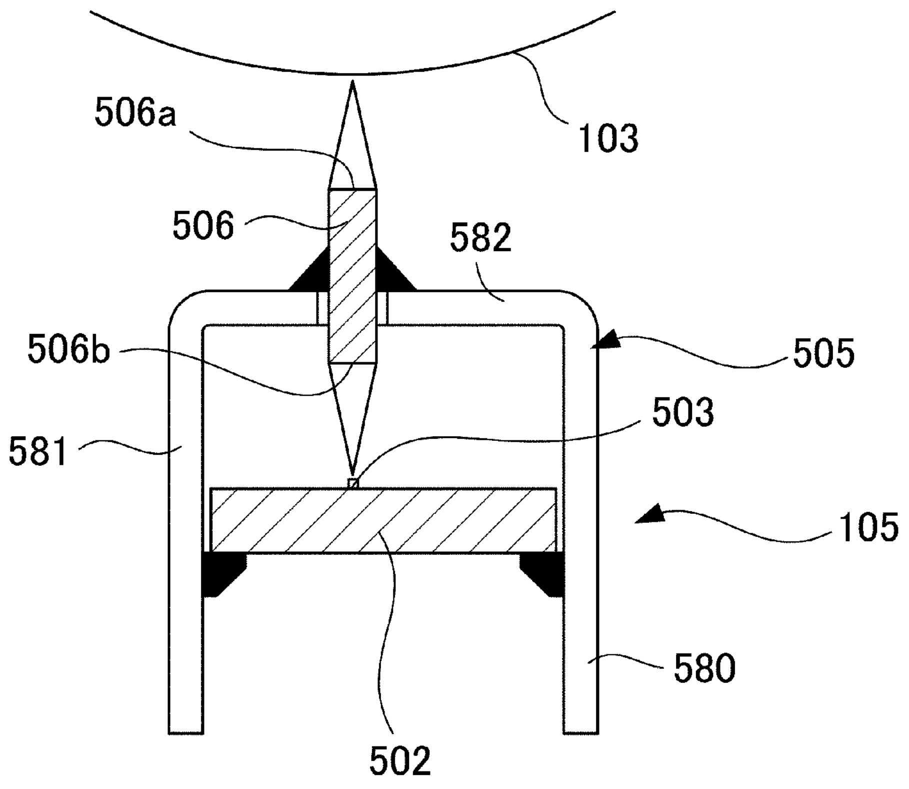

FIG. 4 is a schematic view for illustrating the exposure device.

Figure 5:
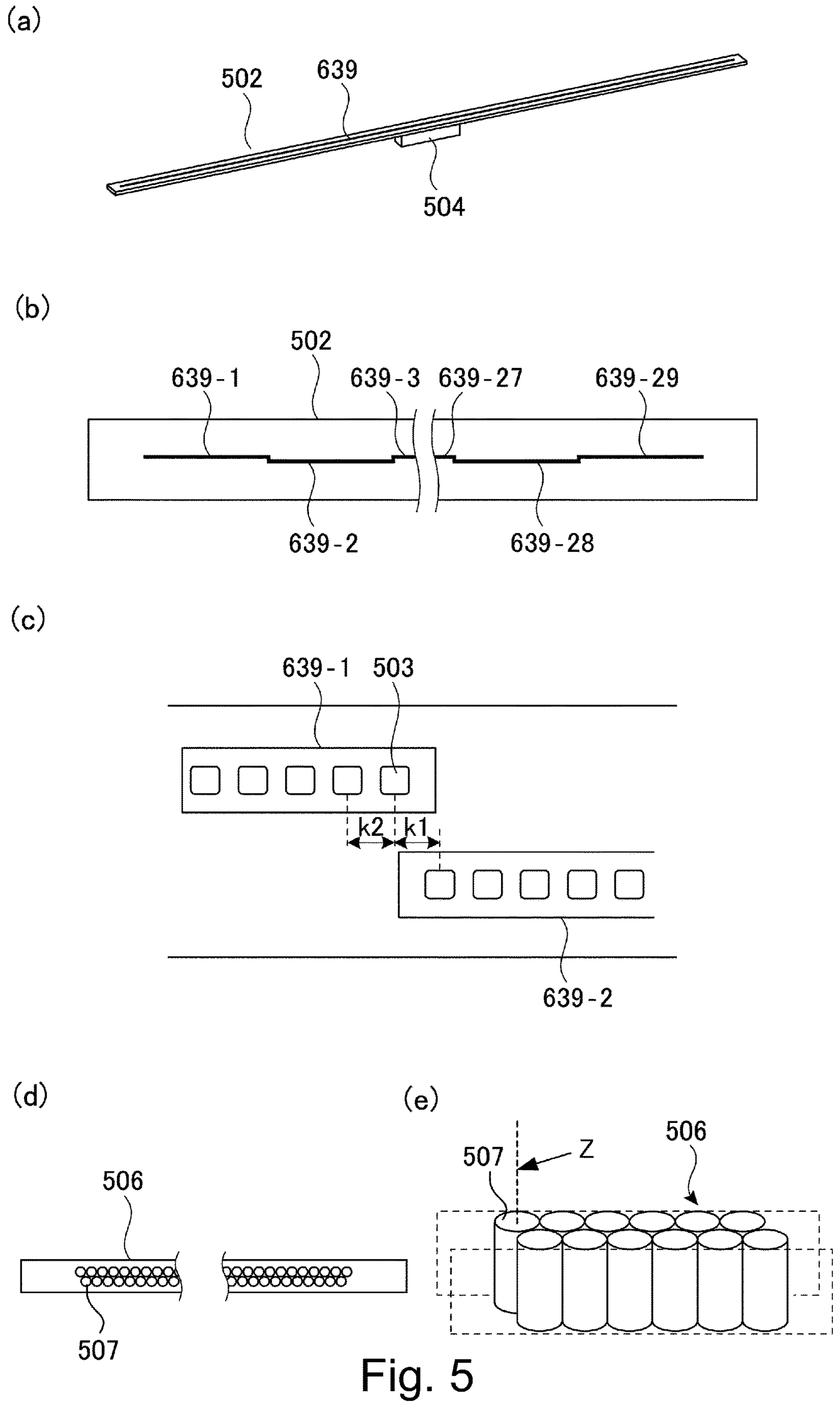

Parts (a) to (e) of FIG. 5 are schematic views of a substrate, LEDs, and lens arrays, in which part (a) is a perspective view showing the substrate, part (b) shows the substrate as seen from a photosensitive drum side, part (c) shows the LEDs on the substrate, part (d) shows the lens arrays as seen from the photosensitive drum side, and part (e) shows the lens arrays.

Figure 6:
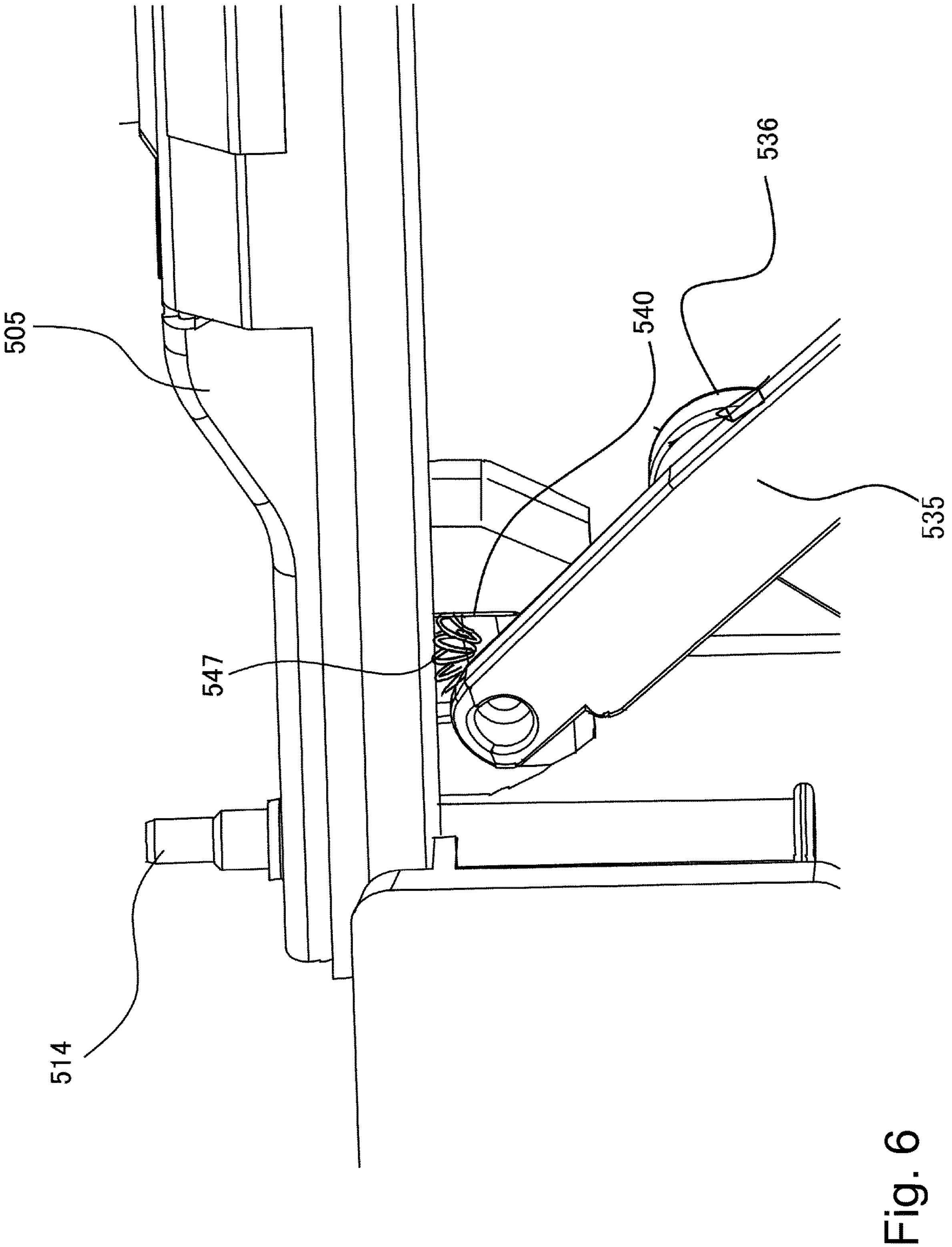

FIG. 6 is an enlarged view showing a part of a lifting and lowering mechanism.

Figure 7:
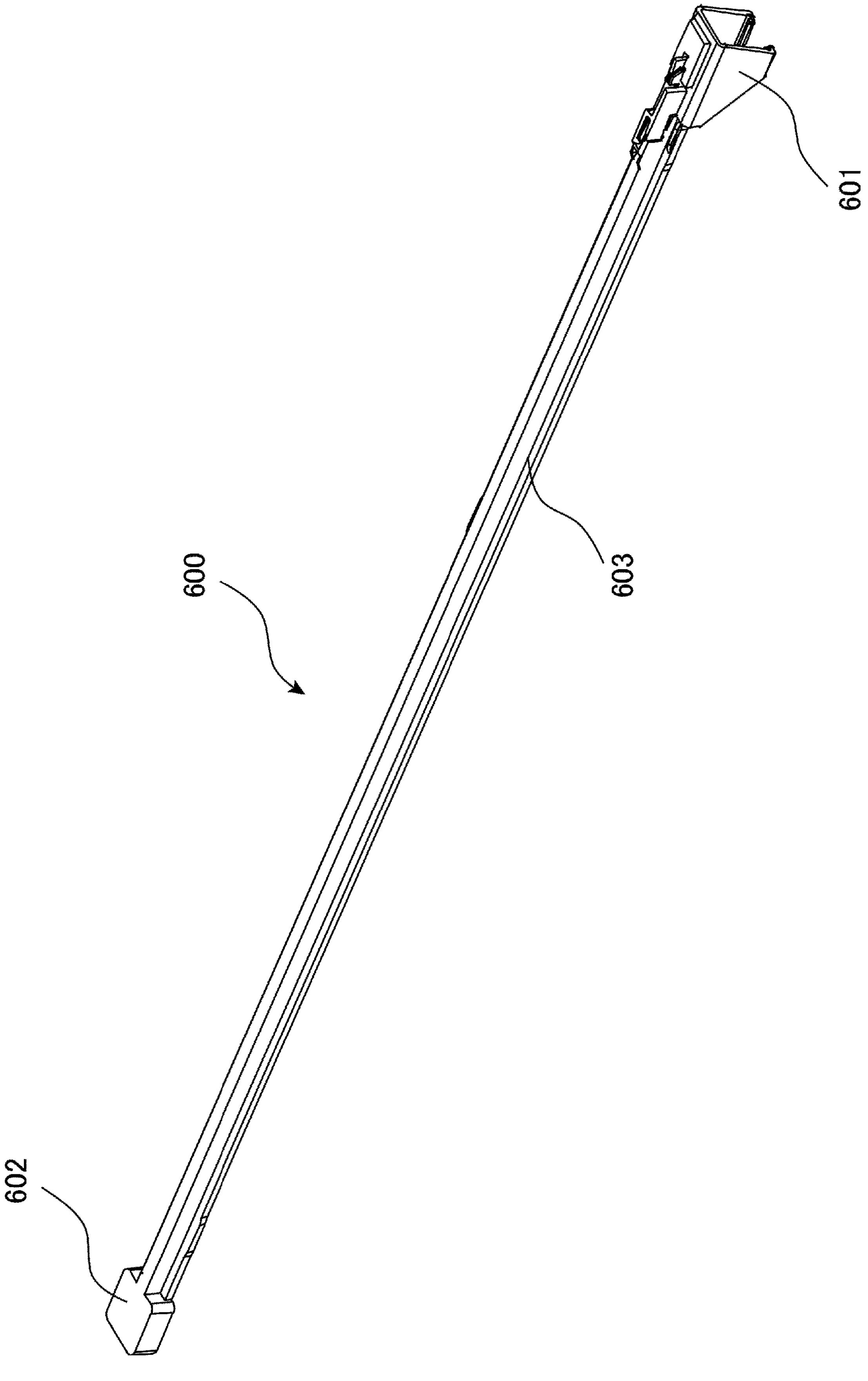

FIG. 7 is a perspective view showing a cleaning member of an embodiment.

Figure 8:
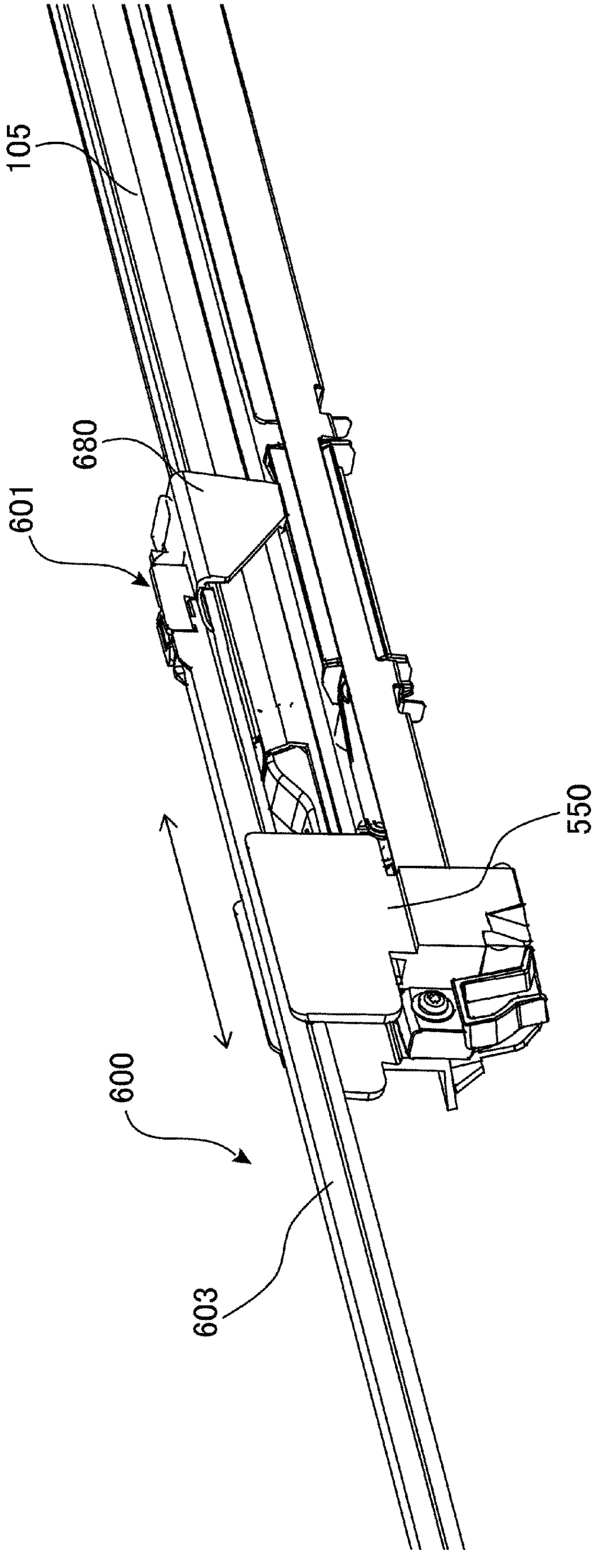

FIG. 8 is a schematic view for illustrating a cleaning operation of the lens array with the cleaning member.

Figure 9:
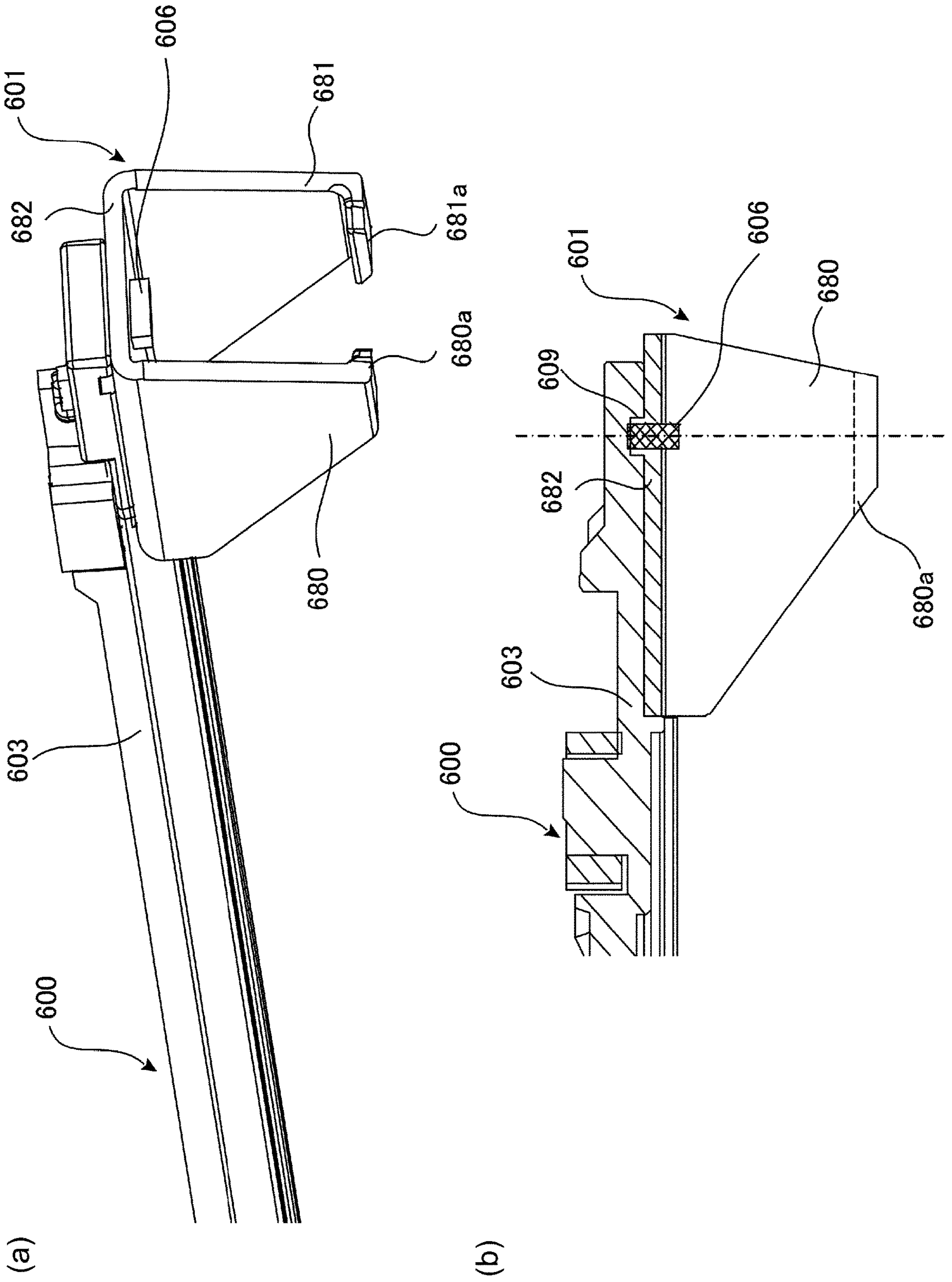

Parts (a) and (b) of FIG. 9 are a perspective view and a sectional view, respectively, showing a cleaning portion and a periphery thereof.

Figure 10:
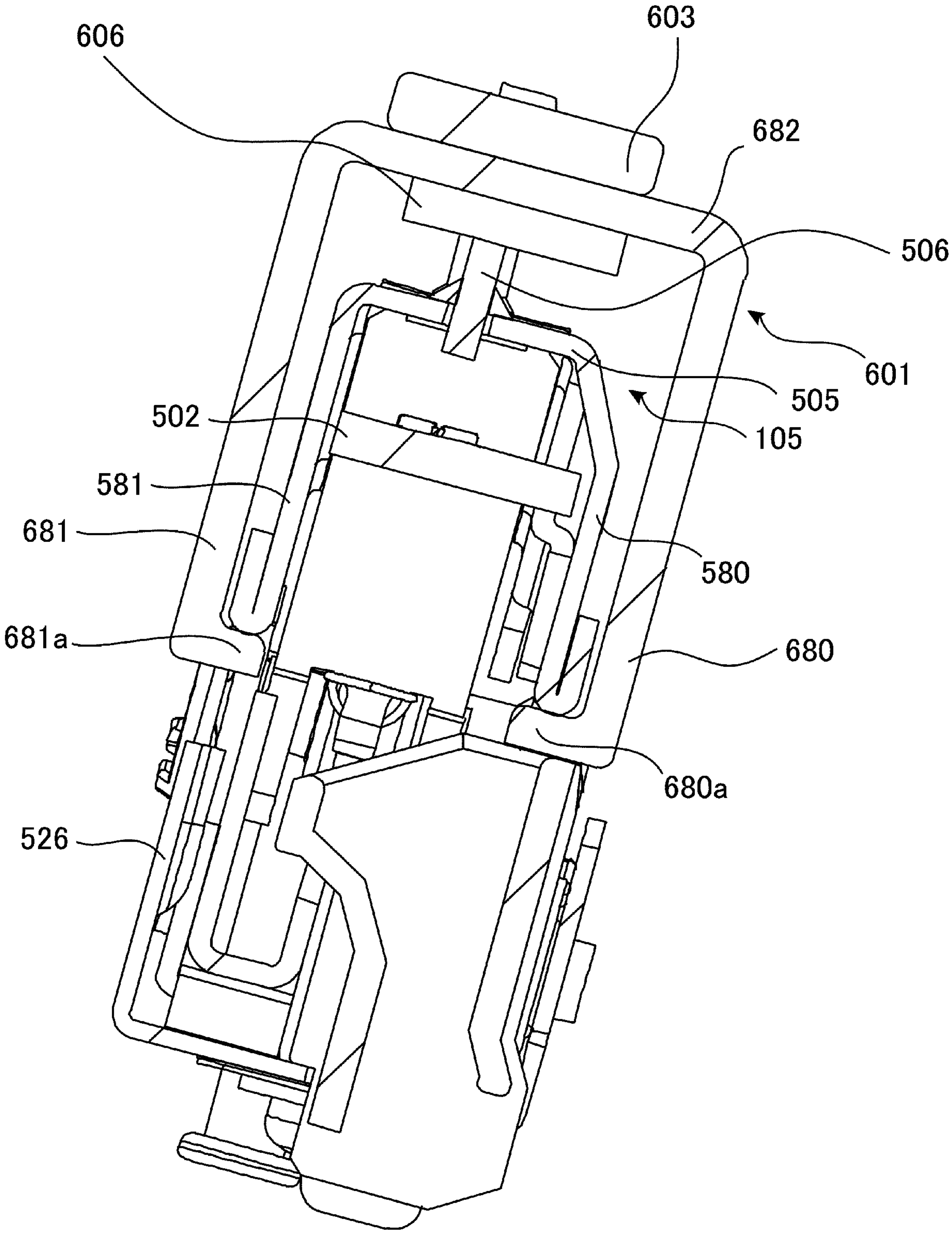

FIG. 10 is a sectional view for illustrating a positional relationship between the cleaning portion and a holding member during cleaning.

Figure 11:
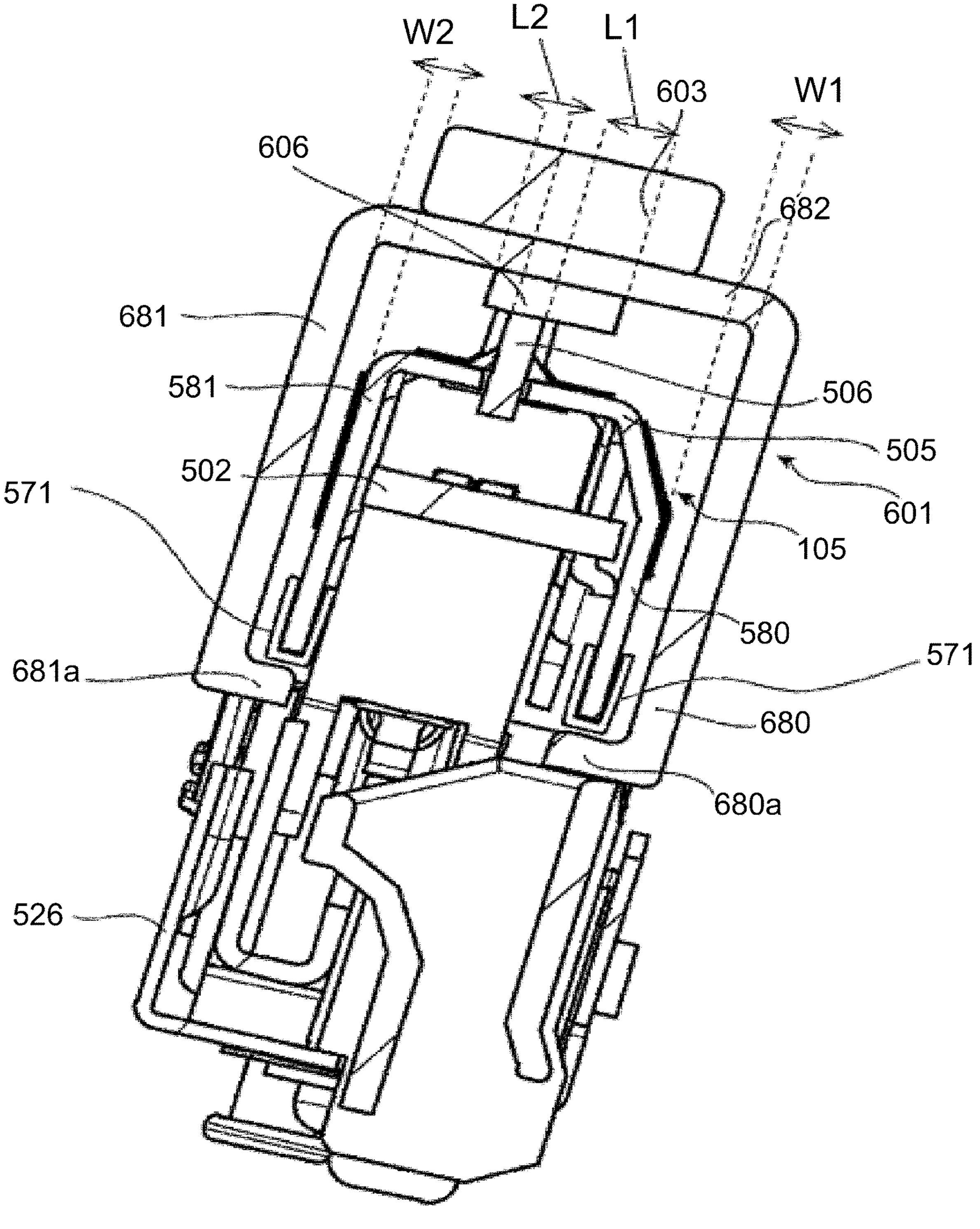

FIG. 11 is a sectional view for illustrating a seal member.

Figure 12:
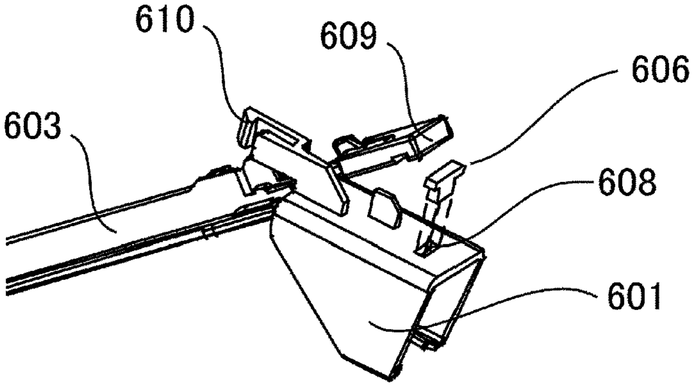
Figure 12:
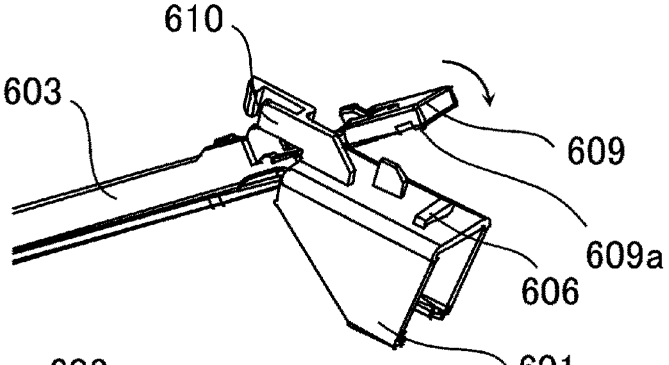
Figure 12:
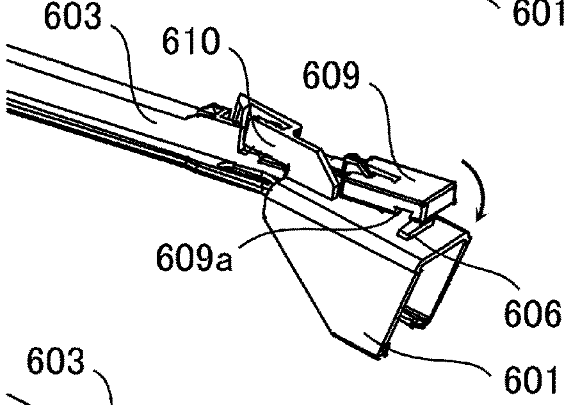
Figure 12:
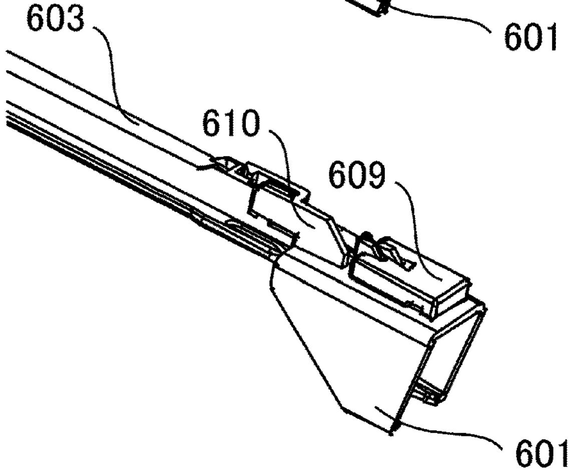

Parts (a) to (d) of FIG. 12 are perspective views for illustrating a mounting procedure of the cleaning portion to a rod-like member, in which parts (a) to (d) shows first to fourth procedures, respectively.

Figure 13:
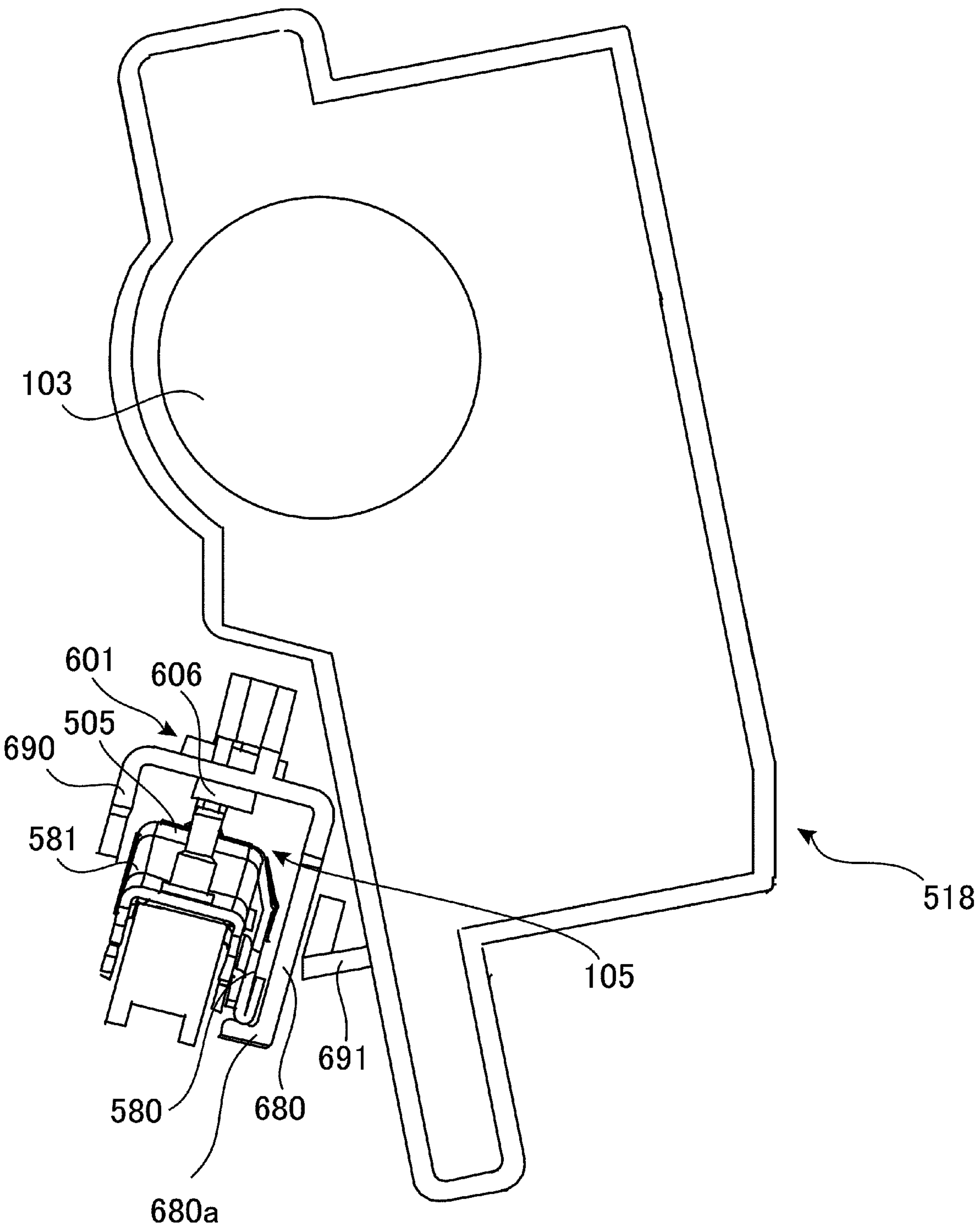

FIG. 13 is a sectional view for illustrating another embodiment.

DESCRIPTION OF THE EMBODIMENTS

In the following, embodiments for carrying out the present invention will be described with reference to the drawings. In the following description, as regards dimensions, materials, shapes and relative arrangement of constituent elements, the scope of the present invention is not intended to be limited to those described below unless otherwise specified.

Image Forming Apparatus

Figure 1:
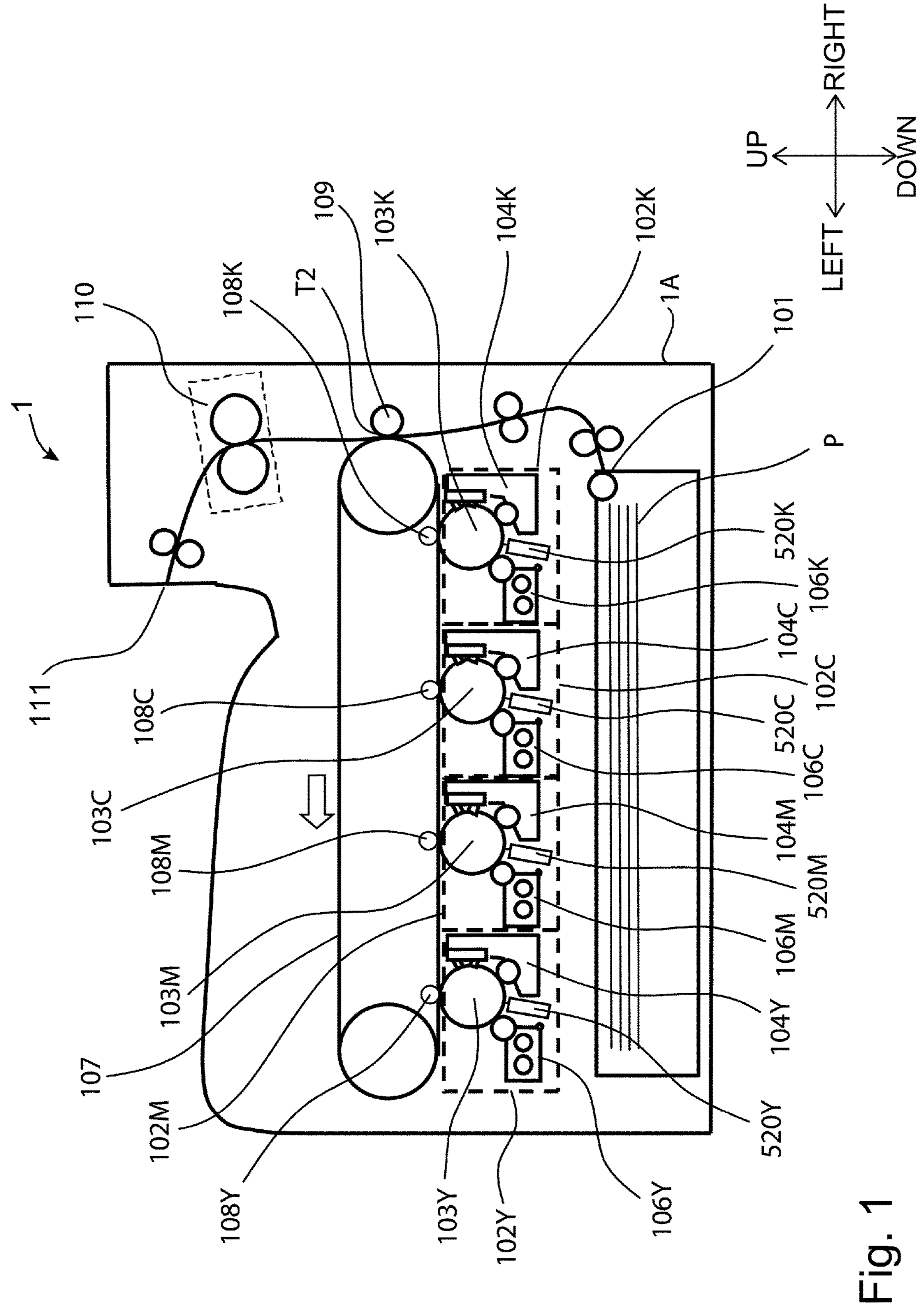
FIG. 1 is a schematic sectional view of an image forming apparatus.

First, a schematic structure of an image forming apparatus 1 will be described using FIG. 1 to part (b) of FIG. 2. The image forming apparatus 1 shown in FIG. 1 is an apparatus employing a so-called "lower surface exposure type" in which photosensitive drums 103Y, 103M, 103C and 103K are exposed to light from below by exposure units 520Y, 520M, 520C and 520K, respectively. However, the image forming apparatus 1 may also be an apparatus employing an "upper surface exposure type" in which the photosensitive drums 103Y, 103M, 103C and 103K are exposed to light from above.

As shown in FIG. 1, the image forming apparatus 1 includes four image forming portions 102Y, 102M, 102C and 102K (hereinafter collectively referred to as also an "image forming portion 102") for forming toner images of yellow, magenta, cyan and black, respectively. The image forming portions 102Y, 102M, 102C and 102K include photosensitive drum 103Y, 103M, 103C and 103K ("photosensitive drum 103"), and charging devices 104Y, 104M, 104C and 104K ("charging device 104") for electrically charging the photosensitive drums 103Y, 103M, 103C and 103K, respectively, and exposure units 520Y, 520M, 520C and 520K ("exposure unit 520") for forming electrostatic latent images by exposing the photosensitive drums 103Y, 103M, 103C and 103K to light. These exposure units 520 include LEDs (Light Emitting Diodes) as exposure light sources capable of emitting L (beams). Further, the image forming portions 102Y, 102M, 102C and 102K include developing devices 106Y, 106M, 106C and 106K ("developing device 106") each for developing the electrostatic latent image on the photosensitive drum 103 with toner into a toner image of an associated color on the photosensitive drum 103.

The image forming apparatus 1 include an intermediary transfer belt 107 onto which the toner images formed on the photosensitive drums 3 are to be transferred and primary transfer rollers 108Y, 108M, 108C and 108K) for successively transferring the toner images from the photosensitive drums 103 onto the intermediary transfer belt 107. The image forming apparatus 1 further includes a secondary transfer roller 109 for transferring the toner images from the intermediary transfer belt 107 onto recording material P fed from a paper (sheet) feeding portion 101 and includes a fixing device 100 for fixing the secondary-transferred toner images on the recording material P. Incidentally, as the recording material P, it is possible to cite sheet materials of various kinds, including sheets such as plain paper, thick paper, roughened paper, uneven paper, coated paper, glossy paper and photographic paper; plastic films; cloths, and the like.

Image Forming Process

The exposure unit 520 exposes to light the surface of the photosensitive drum 103Y charged by the charging device 104Y. As a result, the electrostatic latent image is formed on the photosensitive drum 103Y. Then, the developing device 106Y develops the electrostatic latent image, formed on the photosensitive drum 103Y, with yellow toner. A resultant yellow toner image formed on the photosensitive drum 103Y through development of the electrostatic latent image is transferred onto the intermediary transfer belt 107 by the primary transfer roller 108Y. The toner images of magenta, cyan and black are also transferred onto the intermediary transfer belt 107 by a similar image forming process.

The respective color toner images transferred on the intermediary transfer belt 107 are fed to a secondary transfer portion T2 by the intermediary transfer belt 107. To the secondary transfer roller 109 disposed at the secondary transfer portion T2, a transfer bias for transferring the toner images onto the recording material P has been applied. The toner images fed to the secondary transfer portion T2 are transferred, onto the recording material P fed from the paper feeding portion 101, under application of the transfer bias to the secondary transfer roller 109. The recording material P on which the toner images are transferred is fed to the fixing device 100. The fixing device 100 fixes the toner images on the recording material P by heat and pressure. The recording material P subjected to a fixing process by the fixing device 100 is discharged onto a paper (sheet) discharge portion 111.

Drum Unit and Developing Unit

As shown in parts (a) and (b) of FIG. 2, in the image forming apparatus 1 of this embodiment, drum units 518Y, 518M, 518C and 518K (hereinafter, also referred collectively as a "drum unit 518") are mounted. The drum unit 518 is a cartridge to be exchanged by an operator such as a user or a service person. The drum unit 518 rotatably supports the photosensitive drum 103.

Further, in the image forming apparatus 1, developing units 641Y, 641M, 641C and 641K (hereinafter, also referred collectively as a "developing unit 641") which are separate members from the drum unit 518 is mounted. The developing unit 641 is a cartridge prepared by integrally assembling the developing device 106 shown in FIG. 1 and a toner accommodating portion into a unit. The developing device 106 includes a developing sleeve (not shown) for carrying a developer (toner and a carrier). The developing unit 641 is provided with a plurality of gears for rotating a screw for stirring the toner and the carrier. When these gears are aging-deteriorated or the like, the operator dismounts the developing unit 641 from an apparatus main assembly 1A of the image forming apparatus 1 and exchanges the developing unit 641 with new one. Incidentally, the forms of the drum unit 518 and the developing unit 641 are not limited to a constitution of separate cartridges, but may also be constituted as a process cartridge prepared by integrally assembling the drum unit 518 and the developing unit 641 into a unit.

The image forming apparatus 1 includes a front side plate 642 formed with a metal plate and a rear side plate 643 formed with a metal plate. The front side plate 642 is a side wall provided on a front side of the image forming apparatus 1 and forms a part of a casing of the apparatus main assembly 1A on the front side of the image forming apparatus 1. The rear side plate 643 is a side wall provided on a rear side of the image forming apparatus 1 and forms a part of the casing of the apparatus main assembly 1A on the front side of the image forming apparatus 1. The front side plate 642 and the rear side plate 643 are disposed opposed to each other, and an unshown metal plate as a beam is bridged between these plates. Incidentally, herein, the front side refers to a side where the operator inserts and extracts the drum unit 518 relative to the apparatus main assembly 1A.

The front side plate 642 is provided with an opening through which the drum unit 518 and the developing unit 641 can be inserted from the front side into and extracted from the image forming apparatus 1 by the operator. The drum unit 518 and the developing unit 641 are mounted at a predetermined position of the main assembly of the image forming apparatus 1 through the opening (mounting position). Further, the image forming apparatus 1 includes covers 558Y, 558M, 558C and 558K (hereinafter, also referred collectively as a "cover 558") each for covering a front side of both of the drum unit 518 and the developing unit 641 which are mounted in the mounting position. The cover 558 is fixed at one end thereof to the main assembly of the image forming apparatus 1 by a hinge, whereby the cover 558 is rotatable relative to the main assembly of the image forming apparatus 1. The operator opens the cover 558 and takes the drum unit 518 or the developing unit 641 out of the image forming apparatus 1, and then inserts a new drum unit 518 or a new developing unit 641 into the image forming apparatus 1 and closes the cover 558, whereby an exchanging operation is completed.

Here, as shown in part of FIG. 2, in the following description, relative to the apparatus main assembly 1A, the front side plate 642 side and the rear side plate 643 side are defined as a front side (front or front surface side) and a rear side (rear or rear surface side), respectively. Further, a side where the photosensitive drum 103K on which the electrostatic latent image relating to the black toner image is formed is disposed is called a left side, and a side where the photosensitive drum 103Y on which the electrostatic latent image relating to the yellow toner image is formed is disposed is called as a right side. Further, with respect to a direction perpendicular to a front-rear direction and a left-right direction, an upward direction in a vertical direction is called an up direction and a downward direction in the vertical direction is called a down direction. A rotational axis direction of the photosensitive drum 103 coincides with a front-rear direction shown in part (b) of FIG. 2, and a longitudinal direction of an exposure device 105 described later also coincides with the front-rear direction shown in part (b) of FIG. 2. That is, the rotational axis direction of the photosensitive drum 103 and the longitudinal direction of the exposure device 105 are the same direction.

Exposure Unit

Next, the exposure unit 520 will be described using part (a) of FIG. 3 to FIG. 6 while making reference to FIG. 1. As shown in FIG. 1, in this embodiment, the photosensitive drum 103 is exposed to light from blow, and for this purpose, the exposure unit 520 is provided on a side lower than the rotational axis direction of the photosensitive drum 103 with respect to the vertical direction. Further, the exposure unit 520 includes, as shown in parts (a) and (b) of FIG. 3, the exposure device 105, a supporting member 526, a link mechanism 530, a positioning pin 514 and an insertion guide 550. Incidentally, although illustration is omitted in this embodiment, the link mechanism 530 and the positioning pin 514 are provided not only on the front side but also on the rear side of the exposure unit 520.

First, the exposure device 105 will be described. The exposure device 105 has a longitudinal shape extending in the rotational axis direction of the photosensitive drum 103 and is of an LED exposure type in which the photosensitive drum 103 is exposed to light by using a plurality of light emitting elements, such as LEDs, arranged along the rotational axis direction of the photosensitive drum 103. As shown in FIG. 4, the exposure device 105 includes a substrate 502, a holding member 505 which is an example of a holder, and a lens array 506. The substrate 502 and the lens array 506 are held by the holding member 505 so as to oppose each other with respect to the vertical direction. In the case of this embodiment, the lens array 506 is supported by a supporting portion 582 which is an example of a base portion so that a light emergent surface of the lens array 502 is exposed on a side where the photosensitive drum 103 is disposed. Further, the substrate 502 is held by two opposing wall portions 580 and 581 which are opposed to each other with respect to a widthwise direction crossing an optical axis direction of a lens (part (d) of FIG. 5 described later) and which are extended from the supporting portion 582 toward a side opposite from the side where the photosensitive drum 103 is disposed. Here, the "widthwise direction" coincides with a direction parallel to a direction (a perpendicular direction) perpendicular to both the optical axis direction of the lens of a plurality of lenses of the lens array 506 and the longitudinal direction of the holding member 505.

Thus, the holding member 505 includes the opposing wall portion 580 extended on one end side of the supporting portion 582 with respect to the vertical direction and the opposing wall portion 581 extended on the other side of the supporting portion 582 with respect to the vertical direction. The opposing wall portion 580 extends from the supporting portion 582 toward a side opposite from the side where the photosensitive drum 103 is disposed relative to the supporting portion 582. Further, the opposing wall portion 581 extends from the supporting portion 582 toward the side opposite from the side where the photosensitive drum 103 is disposed relative to the supporting portion 582. Accordingly, a cross-sectional view of the holding member 505 when the holding member 505 is cut in a direction perpendicular to the longitudinal direction thereof has a substantially U-shape. In actuality, the holding member 505 is prepared by bending a single metal plate. That is, by bending the single metal plate, the supporting portion 582 and the opposing wall portions 580 and 581 can be discriminated from each other. As a result that the single metal plate is subjected to bending (process), the holding member 505 including the supporting portion 582 and the opposing wall portions 580 and 581 each extended from the supporting portion 582 is completed.

Thus, in this embodiment, the supporting portion 582 and the opposing wall portions 580 and 581 are an integral member, both each thereof may also be a separate member separable from the other member.

The holding member 505 is, for example, a metal-mode member formed by bending a metal plate obtained by subjecting a galvanized steel plate, a cold-rolled steel plate, or the like to plating (process). In order to appropriately expose the photosensitive drum 103 to light by the exposure device 105, the holding member 505 requires strength such that the holding member 505 is not readily deformed by an external force, heat and the like so that a focus of the lens array 506 always conforms to the surface of the photosensitive drum 103 when the exposure device 105 is in an exposure position described later. Therefore, in this embodiment, the holding member 505 formed by bending the metal plate in the substantially U-shape is used. By forming the holding member 505 through the bending of the metal plate, the strength such that the holding member 505 is not readily deformed is ensured, and in addition, a production cost can be suppressed.

As shown in part (a) of FIG. 5, on one surface of the substrate 502, LED chips 639 are mounted, and on the other surface of the substrate 502 a connector 504 is provided. Further, although illustration is omitted on the substrate 502, electrical wiring for supplying control signals to the respective LED chips 639. To the connector 504, one end of an unshown flexible flat cable (FFC) is connected, for example. The other end of the FFC is connected to an unshown cleaning rod drum unit in the main assembly of the image forming apparatus 1. In this case, when a control signal is inputted from the controller of the image forming apparatus 1 through the FFC and the connector 504, the LED chips 639 are driven depending on the control signal supplied through the wiring.

As shown in part (b) of FIG. 5, on one surface of the substrate 502, a plurality of LED chips 639-1 to 639-29 (29 LED chips in this embodiment) are arranged. On each of the LED chips 639-1 to 639-29, 516 LEDs 503 are arranged in a line along a longitudinal direction of the substrate 502 (along the rotational axis direction of the photosensitive drum 103). As shown in part (c) of FIG. 5, a center distance k2 between adjacent LEDs 503 on each LED chip 639 corresponds to resolution of the image forming apparatus 1. For example, in the case where the resolution of the image forming apparatus 1 is "1200 dpi", the LEDs 503 are arranged in a line so that the center distance k2 between adjacent LEDs 503 is "21.16 μm". In this case, an exposure range of the exposure device 105 is "about 316 mm". Here, a photosensitive layer on the photosensitive drum 103 is formed so as to have a width of, for example, "316 mm" or more with respect to the rotational axis direction. A long-side length of A4-size recording material and a short-side length of A3-size recording material are "297 mm", and therefore, in the case of this embodiment, the exposure device 105 has the exposure range in which the image can be formed on the A4-size recording material and the A3-size recording material.

The above-described LED chips 639-1 to 639-29 are alternately disposed in two (parallel) lines along the rotational axis direction of the photosensitive drum 103. That is, as shown in part (b) of FIG. 5, odd-numbered LED chips 639-1, 639-3, . . . 639-29 counted from a left side in the figure are mounted on the substrate 502 in a line with respect to the longitudinal direction. Further, even-numbered LED chips 639-2, 639-4, . . . 639-28 counted from the left side are mounted on the substrate 502 in a line with respect to the longitudinal direction. Thus, as shown in part (b) of FIG. 5, a center distance k1 between the LED 503 disposed at one end of one (e.g., 639-1) of adjacent (different) LED chips 639 and the LED 503 disposed at the other end of the other one (e.g., 639-2) of the adjacent LED chips 639 can be made equal to the above-described center distance k2.

Incidentally, in this embodiment, a constitution using the LEDs 503 as the light emitting elements is described, but as the light emitting elements, organic EL (electro luminescence) elements may also be used.

Further, as shown in part (d) of FIG. 5, the lens array 506 as a lens member is provided on one surface of the substrate 502 on which the LED chips 639 are mounted. The lens array 506 includes a plurality of lenses 507 which are arranged in two lines along an arrangement direction of the plurality of LEDs 503, and has a function of collecting and condensing the light emitted from the LEDs 503. As shown in part (e) of FIG. 5, the respective lenses 507 of the lens array 506 are alternately disposed so that with respect to an arrangement direction of the lenses 507 arranged in one line, one of lenses 507 arranged in the other line contacts both of adjacent two lenses 507 arranged in the arrangement direction of the lenses 507 arranged in the above-described one line. Each of the lenses 507 is a cylindrical rod lens made of glass, for example, and has an incident surface on which the light emitted from the LED 503 is incident and an emitting (emergent) surface from which the light entering from the incident surface is emitted. Incidentally, a material of the lens 507 is not limited to glass but may also be plastics. Also shapes of the lenses 507 are not limited to the cylindrical shape but may also be a polygonal prism shape such as a hexagonal prism shape.

A broken line Z shown in part (e) of FIG. 5 represents an optical axis of the lens 507. In the case of this embodiment, as described later, in order to bring the exposure device 105 near to the photosensitive drum 103 in conformity to the focal length (for example, 3.0±0.3 mm) of the lens array 506, the exposure device 105 is moved in a direction roughly along the optical axis of the lens 507 indicated by a broken line Z. Incidentally, the optical axis of the lens 507 referred to herein means a line connecting a center of a light emergent surface of the lens 507 and a focus of the lens 507.

In the case of this embodiment, as shown in FIG. 4, the lens array 506 forms light flux emitted from the LED 503 in an image as an equal-magnification erect image on the surface of the photosensitive drum 103. At this time, a distance from the LED 503 and an incident surface 506*b* of the lens array 506 and a distance from a light emergent surface 506*a* of the lens array 506 to the surface of the photosensitive drum 103 are substantially equal to each other. The distance from the LED 503 to the incident surface 506*b* of the lens array 506 is required to have high accuracy on a micron order in conformation to the focal length of the lens array 506. For that reason, this distance is strictly adjusted, and then the substrate 502 and the lens array 506 are fixed to the holding member 505 by bonding.

Next, a mechanism for causing the exposure device 105 to reciprocate between an exposure position close to the photosensitive drum 103 and a retracted position away from the photosensitive drum 103 will be described using parts (a) and (b) of FIG. 3 and FIG. 6 while making reference to part (a) of FIG. 2. The exposure position is a position where the exposure device 105 is capable of exposing the photosensitive drum 103 to light and where the exposure device 105 is close to the photosensitive drum 103, and the retracted position is a position where the exposure device 105 is moved away from the photosensitive drum 103 in order to perform maintenance such as a cleaning operation. In the case of this embodiment, the exposure device 105 moves between the exposure position and the retracted position in accordance with opening and closing of the cover 558.

As shown in part (a) of FIG. 3, the holding member 505 of the exposure device 105 is provided with the positioning pin 514. In this embodiment, the positioning pin 514 is a straight pin made of metal. When the exposure device 105 is moved from the projected portion to the exposure position, the positioning pin 514 is abutted against the drum unit 518, so that an interval (gap) depending on the focal length of the lens array 506 is formed between the light emergent surface 506*a* (FIG. 4) of the lens array 506 and the surface of the photosensitive drum 103. Thus, the exposure position of the exposure device 105 relative to the photosensitive drum 103 is determined. In this embodiment, the interval between the surface of the photosensitive drum 103 and the light emergent surface of the lens array 506 when the exposure device 105 is positioned at the exposure position is adjusted to about 3 mm which is the focal length of the lens array 506. A length of the positioning pin 514 is determined so as to realize such an interval, and the positioning pin 514 is fixed to the holding member 505 by welding or bonding.

The supporting member 526 supports the exposure device 105 through the link mechanism 530. The link mechanism 530 includes a large link member 535 and a small link member 536, and the large link member 535 supports the holding member 505. The supporting member 526 is formed by bending, for example, a long metal plate extending in the rotational axis direction of the photosensitive drum 103 so that the resultant supporting member 526 has a substantially U-shaped cross-section when the supporting member 526 is cut perpendicularly to the longitudinal direction. By doing so, on the supporting member 526, the above-described link mechanism 530 and a slidable member 525 described later can be provided. The supporting member 526 is fixed to the apparatus main assembly 1A of the image forming apparatus 1 by being fixed to the front side plate 642 on one longitudinal end side (front side) thereof and by being fixed to the rear side plate 643 on the other longitudinal end side (rear side) thereof.

The supporting member 526 is provided with the slidable member 525 movable in the longitudinal direction of the supporting member 526. The slidable member 525 slides (moves) in the front-rear direction relative to the supporting member 526 with an opening/closing operation of the cover 558 provided on the front side of the image forming apparatus 1. Correspondingly to the slide (movement) of the slidable member 525 relative to the supporting member 526, the large link member 535 and the small link member 536 are rotated, so that the exposure device 105 reciprocates so as to move toward and away from the supporting member 526. In the following, this will be described specifically.

First, the case where a state of the exposure device 105 is changed from a state shown in part (a) of FIG. 3 to a state shown in part (b) of FIG. 3, i.e., the case where the position of the exposure device 105 is changed from the exposure position to the retracted position will be described. In accordance with opening of the cover 558, the slidable member 525 is slid (moved) from the front side to the rear side. When the slidable member 525 is slid from the front side to the rear side, the large link member 535 is rotated counterclockwise. The small link member 536 is rotatably connected to the supporting member 526 on one end side, and therefore, is rotated clockwise relative to the supporting member 526 in interrelation with the rotation of the large link member 535. Here, the large link member 535 is rotatably connected to the holding member 505 on the other end side, and therefore, is rotated counterclockwise in interrelation with the slidable member 525, so that the holding member 505 is moved in a direction away from the photosensitive drum 103. Thus, the exposure device 105 is moved from the exposure position to the retracted position. In this embodiment, in the case where the exposure device 105 is in the retracted position, a gap such that a part of a cleaning member 600 can enter and pass through between relatives an end portion of the holding member 505 and the supporting member 526 is ensured with respect to the longitudinal direction (FIG. 10 described later).

Then, the case where the state of the exposure device 105 is changed from a state shown in part (b) of FIG. 3 to a state shown in part (a) of FIG. 3, i.e., the case where the position of the exposure device 105 is changed from the retracted position to the exposure position will be described. In accordance with closing of the cover 558, the slidable member 525 is slid (moved) from the front side to the rear side. When the slidable member is slid from the rear side to the front side, the large link member 535 is rotated clockwise. At the same time, the small link member 536 is rotated counterclockwise. Thus, the large link member 535 is rotated clockwise in interrelation with the slidable member 525, so that the holding member 505 is moved in a direction toward the photosensitive drum 103. Thus, the exposure device 105 is moved from the retracted position to the exposure position. Incidentally, in this embodiment, the movement direction of the exposure device 105 moved between the retracted position and the exposure position substantially coincides with the optical axis direction of the lens array 506.

As shown in FIG. 6, at an end portion of the large link member 535, a cantilever shaft 540 is provided. On the other hand, a torsion coil spring 547 is stretched by the holding member 505, and the cantilever shaft 540 contacts a part of the torsion coil spring 547 with respect to a direction substantially perpendicular to the torsion coil spring 547. When the large link member 535 is rotated clockwise, the cantilever shaft 540 presses the torsion coil spring 547 and thus indirectly pushes up the holding member 505. Further, as described above, the holding member 505 is provided with the positioning pin 514. When the holding member 505 is pushed up by the link mechanism 530 and thus a free end of this positioning pin 514 abuts against the drum unit 518 at a predetermined position, the holding member 505 is stopped. That is, a stroke of the link mechanism 530 is set at a value larger than a necessary amount, and the torsion coil spring 547 urges the holding member 505 while absorbing an overstroke thereof, so that the holding member 505 can be made at rest in a proper position relative to the drum unit 518. Thus, when the position of the holding member 505 relative to the drum unit 518 is determined, the interval between the photosensitive drum 103 and the light emergent surface 506*a* (FIG. 4) of the lens array 506 is also determined, so that movement of the exposure device 105 to the exposure position is completed.

Incidentally, on one longitudinal end side (front side) of the supporting member 526, an inserting guide 550 into which a cleaning member 600 (FIG. 7) which is an example of a cleaning rod described later is to be inserted is provided. The supporting member 526 is fixed to the apparatus main assembly 1A of the image forming apparatus 1, so that the insertion guide 550 is also fixed to the apparatus main assembly 1A of the image forming apparatus 1. The insertion guide 550 rotates movement (motion) of the cleaning member 600 in order to properly guide, toward the holding member 505, the cleaning member 600 to be inserted from an outside of the apparatus main assembly 1.

Cleaning Member

Incidentally, as has already been described above, when the light emergent surface 506*a* of the lens array 506 is contaminated with the foreign matter such as the toner and the paper powder fallen from the photosensitive drum 103 or the like, the light emitted from a contaminated portion of the plurality of lenses 503 is partially blocked. This causes an occurrence of image defect such as density non-uniformity on the image formed on the recording material P. Therefore, the cleaning member capable of cleaning the lens array 506 (specifically the light emergent surface 506*a*) is prepared in advance.

FIG. 7 is a perspective view showing the cleaning member 600 of this embodiment. As shown in FIG. 7, the cleaning member 600 of this embodiment includes a cleaning portion 601, a gripping portion 602 and a rod-like member 603. The rod-like member 603 formed in an elongated rod shape is provided on one longitudinal end side with the cleaning portion 601 for cleaning the lens array 506 and is provided on the other longitudinal end side with the gripping portion 602. The operator grips the gripping portion 602 and then inserts the cleaning 600 into the image forming apparatus 1 and extracts the cleaning member 600 from the image forming apparatus 1, so that the operator is capable of cleaning the light emergent surface 506*a* of the lens array 506.

The cleaning member 600 is, for example, mounted on an inside of a front cover provided on the front side of the image forming apparatus 1 so as to be openable and closable. Here, the front cover referred to herein is provided on the front side of the image forming apparatus 1 and is a door opened and closed by the operator in order to carry out exchange of the drum unit 518, the developing unit 641 or the like, and cleaning of the lens array 506 with the cleaning member 600. When there arises a need to clean the lens array 506, the operator removes the cleaning member 600 from the inside of the front cover of the image forming apparatus 1. Incidentally, the cleaning member 600 is not limited to the cleaning member provided inside the front cover, but may also be provided at another portion of the image forming apparatus 1 or may also be not provided in or on the image forming apparatus 1. Or, every need of the cleaning, a service person (operator) may also bring the cleaning member 600.

Here, an outline of an actual cleaning operation of the lens array 506 with the cleaning member 600 will be described using FIG. 8. In order to clean the exposure device 105, first, the operator opens the front cover and then opens the cover 558 (part (a) of FIG. 2). In the case of this embodiment, the cover 558 is opened and closed in interrelation with the opening and closing of the front cover. In accordance with the opening of the cover 558, the exposure device 105 is moved from the exposure position to the retracted position.

Then, the operator removes the cleaning member 600 from the front cover, and inserts the removed cleaning member 600 into the insertion guide 550. Then, the cleaning portion 601 provided at a free end of the inserted cleaning member 600 with respect to an insertion direction of the cleaning member 600 is guided to the insertion guide 550, and is inserted into the exposure device 105 moved to the retracted position. Then, as described specifically later, with reciprocation (motion) of the cleaning member 600 by the operator, the cleaning portion 601 moves while cleaning the exposure device 105.

Incidentally, in the case where in the exposure device 105, the holding member 505 made of the metal by subjecting the metal plate to the bending is used, as has already been described above, when compared with the holding member made of the resin material, it was not easy to form guiding grooves from guiding the cleaning member 600, on the holding member 505. However, in order to reliably cause the cleaning member 600 to clean the lens array 506, there is a need to guide the cleaning member 600 to be caused to reciprocate by the operator. Therefore, in this embodiment, the cleaning member 600 is capable of being guided in the case where the holding member 505 which has not been subjected to processing for guiding the cleaning member 600, such as formation of the above-described projected portions, i.e., the holding member 505 on which the guiding grooves are formed is used. For that purpose, with respect to the optical axis direction of the lens 507, the cleaning portion 601 in this embodiment is formed so as to be contactable to the end portion of the holding member 505 from an outside on a side opposite from a side where the photosensitive drum 103 is provided, in a state in which the cleaning member 600 is inserted into the exposure provided 105. Incidentally, herein, the "lower surface exposure type" is described as an example, so that the cleaning portion 601 contacts a lower end portion of the holding member 505 from the outside. In the following, a constitution for realizing it will be described using part (a) of FIG. 9 to FIG. 10.

The cleaning portion 601 in this embodiment includes a wall surface portion 682. The wall surface portion 682 is provided at a position opposing the lens array 506 in a state in which the cleaning member 600 is inserted into the exposure device 105. Further, as shown in parts (a) and (b) of FIG. 9, to the wall surface portion 682, a cleaning blade 606 is attached so as to be mountable to and dismountable from the wall surface portion 682. The cleaning blade 606 is, for example, a 0.5 mm-thick flexible member made of an urethane rubber is fixed so as to project from the wall surface portion 682 toward the lens array 506 side (inside) by about 3 mm, for example.

The cleaning blade 606 as a slidable portion slides on the lens array 506 in accordance with the reciprocation of the cleaning member 600, and thus cleans the lens array 506. In the case of this embodiment, with respect to a widthwise direction crossing the optical axis direction (the broken line Z of part (e) of FIG. 5) of the lens 507 and crossing the longitudinal direction of the rod-like member 603, the cleaning blade 606 is extended in the widthwise direction on the basis of a substantially center (line) of the wall surface portion 682. Thus, during the reciprocation of the cleaning member 600, moment generated by reaction between the cleaning blade 606 and the lens array 506 and reaction between projected portions 680*a* and 681*a* described later and the holding member 505, can be made small. As a result, when the cleaning member 600 is caused to reciprocate, an attitude of the cleaning portion 601 is stabilized, so that the operator is capable of smoothly cleaning the lens array 506.

Incidentally, the thickness and the material of the above-described cleaning blade 606 are merely an example, and the cleaning blade 606 may also be made of, for example, a silicone rubber or a resin material. Further, instead of use of the cleaning blade 606, a cleaning pad formed with a sponge, a cleaning pad prepared by bonding a nonwoven fabric to a surface of the sponge, and the like may also be used.

Further, the cleaning portion 601 in this embodiment includes two (first and second) side wall portions 680 and 681 provided opposed to the opposing wall portion 580 (first opposing wall portion) and the opposing wall portion 581 (second opposing wall portion), respectively. In this embodiment, an example in which the first side wall portion 680 and the second side wall portion 681 are provided so as to oppose each other on opposite sides of the wall surface portion 682 with respect to the widthwise direction.

As shown in FIG. 10, these side wall portions 680 and 681 are extended from the wall surface portion 682 toward the holding member 505 side on the opposite sides of the wall surface portion 682. These side wall portions 680 and 681 are positioned outside the opposing wall portions 580 and 581 of the holding member 505 in the state in which the cleaning member 600 is inserted into the exposure device 105. That is, the side wall portion 680 on the right side of the insertion direction of the cleaning portion 601 is positioned on the right side (outside) in the figure than the opposing wall portion 580 of the holding member 505 is, and the side wall portion 681 on the left side of the insertion direction of the cleaning portion 601 is positioned on the left side (outside) in the figure than the opposing wall portion 581 of the holding member 505 is. In other words, the cleaning portion 601 is disposed so that the side wall portions 680 and 681 sandwiches the holding member 505 from the left-right direction. However, some gap is ensured each of between the side wall portion 680 and the opposing wall portion 580 and between the side wall portion 681 and the opposing wall portion 581. Accordingly, correspondingly to this gap, movement of the cleaning portion 601 relative to the holding member 505 in the left-right direction is allowed.

Further, with respect to the optical axis direction of the lens 507, the cleaning portion 601 in this embodiment is formed so as to be contactable to the lower end portion of the holding member from the outside on a side opposite from the side where the photosensitive drum 103 is disposed, in the state in which the cleaning member 600 is inserted into the exposure device 105. Specifically, as shown in part (a) of FIG. 9, the side wall portions 680 and 681 of the cleaning portion 680 are provided with the projected portions 680*a* and 681*a*, respectively, projecting toward the inside. These projected portions 680*a* and 681*a* are formed in a length in which the projected portions 680*a* and 681*a* are extended toward the inside with respect to the widthwise direction than the opposing wall portions 580 and 581 of the holding member 505 are. Further, in a state in which with respect to the optical axis direction of the lens 507 the positions 680*a* and 681*a* contact the lower end portions of the opposing wall portions 580 and 581, respectively, the projected portions 680*a* and 681*a* are formed so that the cleaning blade 606 of the wall surface portion 682 contacts the lens array 506. In other words, when the projected portions 680*a* and 681*a* are in a state of contacting the lower end portions of the opposing wall portions 580 and 581, respectively, a part of the cleaning blade 606 contacts the light emergent surface of the lens array 506 in a flexed state. Accordingly, the user is capable of bringing the cleaning blade 606 into contact with the light emergent surface of the lens array 506 with reliability only by inserting the cleaning rod 600 into the image forming apparatus 1.

In this embodiment, the projected portions 680*a* and 681*a* and the side wall portions 680 and 681 constitute a restricting portion. That is, when the cleaning portion 601 moves with the reciprocation of the cleaning member 600, the projected portions 680*a* and 681*a* abut against free ends of the opposing wall portions 580 and 581, respectively, of the holding member 505 with respect to the optical axis direction of the lens 507 from a side opposite from the side where the projected portion 103 is disposed, so that movement of the lens 507 in the optical axis direction relative to the holding member 505 is restricted. The image forming apparatus 1 of this embodiment is the apparatus employing the lower surface exposure type, and therefore, the projected portions 680*a* and 681*a* abut against the free ends of the opposing wall portions 580 and 581, respectively, from below with respect to the vertical direction. By restricting the movement of the cleaning portion 601 in the optical axis direction of the lens 507, the cleaning blade 606 provided on the wall surface portion 608 is maintained in a state in which the cleaning blade 606 is slid on the light emergent surface of the lens array 506 from an upper side with respect to the vertical direction. Further, when the cleaning portion 601 moves with the reciprocation of the cleaning member 600, movement of the cleaning portion 601 in the left-right direction (sub-scan direction) relative to the holding member 505 is restricted by the side wall portions 680 and 681. By restricting the movement of the cleaning portion 601 in the left-right direction, the cleaning portion 601 is not readily dismounted from the holding member 505 having the movement thereof. In other words, the holding member 505 function, as a whole, as a guide rail for guiding movement of the cleaning portion 601, in the longitudinal direction, disposed so as to cover the holding member 505 in a state in which the cleaning blade 606 is contacted to the lens array 506. By this, the cleaning portion 601 is capable of moving in the longitudinal direction relative to the holding member while maintaining the contact state between the cleaning blade 606 and the lens array 506.

As described above, the projected portions 680*a* and 681*a* abut the free ends of the opposing wall portions 580 and 581, respectively, from below with respect to the vertical direction, so that the movement of the cleaning portion 601 relative to the holding member 505 is "restricted", but some movement is allowed. Specifically, if the cleaning portion 601 is in a state of contacting the light emergent surface of the lens array 506, the cleaning portion 601 may also move in a direction in which the cleaning portion 601 moves toward the photosensitive drum 103. The movement of the cleaning member 600 relative to the holding member 505 is restricted within a tolerance between component parts or some jerkiness in a state in which the cleaning member 600 is engaged with the holding member 505.

As described above, in this embodiment, in the state in which the cleaning member 600 is inserted into the metal-made holding member 505 for holding the lens array 506, a part of the cleaning portion 601 is contacted from the outside to the end portion of the holding member 505 on the side opposite from the side where the photosensitive drum 1 is disposed. For that purpose, as regards the cleaning portion 601, the projected portions 680*a* and 681*a* contacting the lower end portions of the opposing wall portions 580 and 581, respectively, of the holding member 505 were formed as parts of the side wall portions 680 and 681, respectively, in the state in which the cleaning blade 606 contacted the lens array 506. By such a simple constitution, a part of the cleaning portion 601 can be contacted from the outside to the end portion of the holding member 505, with the result that the movement of the cleaning portion 601 in the optical axis direction of the lens 507 relative to the holding member 505 is restricted. By this, the cleaning portion 601 is caused to reciprocate relative to the holding member 505 while maintaining the contact state between the cleaning blade 606 and the lens array 506, so that the operator can properly and easily perform cleaning of the lens array 506 with the cleaning member 600.

Other Embodiments

Incidentally, as shown in FIG. 10, in the opposing wall portions 580 and 581, the free ends slidable on the projected portions 680*a* and 681*a* may preferably be formed in a curved shape by being bent upward with respect to the vertical direction through bending such as hemming bending. By doing so, when the free ends of the opposing wall portions 580 and 581 slide on the projected portions 680 and 681*a* with the cleaning operation, generation of the foreign matter due to abrasion of the cleaning portion 601 by the holding member 505 made of the metal can be suppressed. However, depending on a shape manufacturing constraint and the like, in some cases, of the holding member 505, portions sliding on the projected portions 680*a* and 681*a* are not readily formed in the above-described curved shape. In such cases, as shown in FIG. 11, a seal member 571 as a lubricating member may also be provided between the supporting member (specifically, the lower end portion of each of the opposing wall portions 580 and 581) and an associated one of the projected portions 680*a* and 681*a*. This seal member 571 is a member made of a resin material. Also by doing so, the generation of the foreign matter due to the abrasion of the cleaning portion 601 with the cleaning operation can be suppressed. The seal member 571 may be provided over an entire region of the lower end portion of each of the opposing wall portions 580 and 581 with respect to the longitudinal direction or may also be provided on each of the projected portions 680*a* and 681*a*. The seal member 571 is made of the resin material, and therefore, a frictional force generating when the seal member 571 slides on the holding member 505 is small. For that reason, the cleaning portion 601 smoothly slides on the holding member 505.

Further, as shown in FIG. 11, a gap is formed between the opposing wall portion 580 and the side wall portion 680. A distance of this gap is defined as W1. Further, when the cleaning blade 606 is seen along the optical axis direction of the lens of the lens array 506, a distance from one end of the cleaning blade 606 to one end of the light emergent surface of the lens array 506 is defined as L1. At this time, the gap formed between the opposing wall portion 580 and the side wall portion 680 is adjusted so that W1 becomes a value smaller than L1. In other words, the side wall portions 680 and 681 are formed so as to satisfy a relationship of $W1<L1$.

Similarly, a gap is formed between the opposing wall portion 581 and the side wall portion 681. A distance of this gap is defined as W2. Further, when the cleaning blade 606 is seen along the optical axis direction of the lens of the lens array 506, a distance from the other end of the cleaning blade 606 to the other end of the light emergent surface of the lens array 506 is defined as L2. At this time, the gap formed between the opposing wall portion 580 and the side wall portion 680 is adjusted so that W2 becomes a value smaller than L2. In other words, the side wall portions 680 and 681 are formed so as to satisfy a relationship of $W2<L2$.

Thus, the side wall portions 680 and 681 are constituted, so that even when the cleaning rod 600 moves in the vertical direction relative to the holding member 505, the cleaning blade 606 does not separate from the light emergent surface of the lens array 506 with respect to the vertical direction. That is, even when the cleaning rod 600 moves in the vertical direction relative to the holding member 505, the side wall portion 680 (681) contacts the opposing wall portion 580 (581) before the cleaning blade 606 separates from the light emergent surface of the lens array 506. Thus, the movement of the cleaning rod 600 in the vertical direction relative to the holding member 505. Incidentally, also as regards the cleaning rods shown in FIGS. 10 and 13, a positional relationship between the opposing wall portions, the side wall portions, the lens array and the slidable portions is constituted so as to become the above-described relationship.

Incidentally, the cleaning portion 601 may also be provided so as to be mountable to and dismountable from the rod-like member 603. A mounting procedure of the cleaning portion 601 to the rod-like member 603 will be briefly described using parts (a) to (d) of FIG. 12. First, before the cleaning portion 601 is mounted on the rod-like member 603, as shown in part (a) of FIG. 12, the cleaning blade 606 is inserted and fixed into a hole 608 provided in the cleaning portion 601 in advance. Then, as shown in parts (b) and (c) of FIG. 12, the cleaning portion 601 is rotated, relative to the rod-like member 603, about the front side of the insertion direction as a supporting point. When the cleaning portion 601 is rotated relative to the rod-like member 603, in a recessed portion 609*a* provided on a free end portion 609 of the rod-like member 603, an upper end portion, of the cleaning blade 606, left so as to project from the cleaning portion 601 toward an upper end side is accommodated. Then, as shown in part (d) of FIG. 12, a snap-fitting portion 610 provided on the cleaning portion 601 is engaged with a portion-to-be-engaged of the rod-like member 603, so that the cleaning portion 601 is fixed to the rod-like member 603. Incidentally, not only the cleaning portion 601, but also the gripping portion 602 may also be provided so as to be mountable to and dismountable from the rod-like member 603.

Incidentally, in the above-described embodiment, the cleaning portion 601 including the side wall portions 680 and 681 provided with the projected portions 680*a* and 681*a* at both (opposite) end portions thereof with respect to the widthwise direction was described, but the present invention is not limited thereto. For example, as shown in FIG. 13, a so-called cantilever constitution in which on only one end side of a cleaning portion 601 with respect to the widthwise direction, a side wall portion 680 provided with a projected portion 680*a* as a part of the side wall portion 680 is disposed may also be employed. However, in the case of the cantilever constitution, only by the cantilever side wall portion 680, it becomes difficult to restrict movement of the cleaning portion 601 in the left-right direction, so that the cleaning portion 601 is liable to dismount from the holding member 505 during movement thereof. Therefore, in the case where the cantilever constitution is employed, particularly, a restricting member 691 for restricting movement of the cleaning portion 601 in the widthwise direction may preferably be provided on the apparatus main assembly side. This restricting member 691 may be provided on the drum unit 518 as shown in the figure or may also be provided on the developing unit 641 (part (a) of FIG. 2). This restricting member 691 may also be provided even in the case where the cleaning portion 601 includes the side wall portions 680 and 681 provided with the projected portions 680*a* and 681*a* on both (opposite) sides thereof with respect to the widthwise direction. Further, in the case of the cantilever constitution, on the other end side of the cleaning portion 601 with respect to the widthwise direction, a short restricting wall portion 690 shorter in length than the cantilever side wall portion 680 may also be provided so as to oppose the cantilever side wall portion 680. In the case of an example shown in FIG. 13, the restricting wall portion 690 is capable of restricting the movement of the cleaning portion 601 in the left-right direction by contacting the opposing wall portion 581 of the holding member 505.

Incidentally, although omitted from illustration, the image forming apparatus 1 of this embodiment according to the present invention is also applicable to an image forming apparatus of a so-called "upper surface exposure type" in which the photosensitive drums 103Y, 103M, 103C and 103K are exposed to light from above by the exposure devices 520Y, 520M, 520C and 520K. Further, the image forming apparatus 1 is not limited to the image forming apparatus for the full-color image, in which the plurality of image forming portions 102Y, 102M, 102C and 102K are provided as shown in FIG. 1, but may also be, for example, an image forming apparatus for a monochromatic image in which only one image forming portion 102K for black is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-224693 filed on Dec. 12, 2019, which is hereby incorporated by reference herein in its entirety.

What is claimed is:

1. An image forming apparatus comprising:

a photosensitive member;

a circuit board having a plurality of light emitting elements arranged along a rotational axis direction of the photosensitive drum configured to emit light for exposing the photosensitive member;

a lens array having a light emergent surface and configured to condense light emitted from the plurality of light emitting elements onto the photosensitive member;

a holder which is made of metal, the holder including a first base portion which opposes the photosensitive member and holds the lens array, and the holder including a first holder wall portion and a second holder wall portion which opposes the first holder wall portion with respect to a first direction perpendicular to a second direction along an optical axis of the lens array and to the rotational axis direction, the first holder wall portion and the second holder wall portion extending from the first base portion away from the light emergent surface in the second direction; and a cleaning rod, the cleaning rod comprising:

a rod-like member;

a slidable portion which is provided on the rod-like member and which is slidable on the light emergent surface;

a second base portion opposing the first base portion in a case of the cleaning rod inserted into between the photosensitive member and the light emergent surface;

a first restricting wall portion and a second restricting wall portion configured to restrict movement of the cleaning rod with respect to the first direction, (1) the first restricting wall portion extending from the second base portion away from the photosensitive member in the second direction, the first restricting wall portion including a first projected portion projecting from the first restricting wall portion toward a side where the second restricting wall portion is provided, the first projected portion including a first restricting portion configured to contact an end of the first holder wall portion in the second direction, (2) the second restricting wall portion extending from the second base portion away from the photosensitive member in the second direction, the second restricting wall portion including a second projected portion projecting from the second restricting wall portion toward a side where the first restricting wall portion is provided, the second projected portion including a second restricting portion configured to contact an end of the second holder wall portion in the second direction, wherein a distance between an inner side of the first projected portion and an inner side of the second projected portion in the first direction is shorter than a distance between an inner side of the first holder wall portion and an inner side of the second holder wall portion.

2. An image forming apparatus according to claim 1, wherein an interval between the first restricting wall portion and the first holder wall portion with respect to the first direction is smaller than a distance from one end of the slidable portion to one end of the light emergent surface with respect to the first direction when the slidable portion is seen in the second direction, and an interval between the second restricting wall portion and the second holder wall portion with respect to the first direction is smaller than a distance from the other end of the slidable portion to the other end of the light emergent surface with respect to the first direction when the slidable portion is seen in the second direction.

3. An image forming apparatus according to claim 1, wherein each of the first and second projected portions is provided with a seal material made of a resin material.

4. An image forming apparatus according to claim 1, further comprising a cleaning unit in which the slidable portion, the second base portion, the first restricting wall portion, and the second restricting wall portion are provided and which is mountable to and dismountable from the rod-like member.

5. An image forming apparatus according to claim 1, wherein the slidable portion is provided in the second base portion.

* * * * *